US012735927B2

(12) United States Patent
Urech et al.

(10) Patent No.: US 12,735,927 B2
(45) Date of Patent: Sep. 15, 2026

(54) HOLDING DEVICE FOR A DOOR AND FUNCTIONAL ENTITY WITH A HOLDING DEVICE

(71) Applicant: HAWA SLIDING SOLUTIONS AG, Mettmenstetten (CH)

(72) Inventors: Cédric Urech, Aarau (CH); Marco Bürgisser, Cham (CH)

(73) Assignee: HAWA SLIDING SOLUTIONS AG, Mettmenstetten (CH)

( * ) Notice: Subject to any disclaimer, the term of this patent is extended or adjusted under 35 U.S.C. 154(b) by 1 day.

(21) Appl. No.: 18/869,606

(22) PCT Filed: Jun. 1, 2023

(86) PCT No.: PCT/EP2023/064760
§ 371 (c)(1),
(2) Date: Nov. 26, 2024

(87) PCT Pub. No.: WO2024/002615
PCT Pub. Date: Jan. 4, 2024

(65) Prior Publication Data
US 2025/0333987 A1 Oct. 30, 2025

(30) Foreign Application Priority Data
Jul. 1, 2022 (EP) ..................................... 22182690
Apr. 13, 2023 (EP) ..................................... 23167854

(51) Int. Cl.
*E05C 9/16* (2006.01)
*E05C 19/16* (2006.01)
*E05F 1/10* (2006.01)

(52) U.S. Cl.
CPC ............ *E05C 19/165* (2013.01); *E05F 1/105* (2013.01); *E05Y 2201/221* (2024.05)

(58) Field of Classification Search
CPC ... E05C 19/165; E05F 1/105; E05Y 2201/221
See application file for complete search history.

(56) References Cited

U.S. PATENT DOCUMENTS 4,409,806 A * 10/1983 Propst ................. E05B 47/0043 70/354
4,875,721 A * 10/1989 Okamoto .................. E05C 9/02 292/29

(Continued)

FOREIGN PATENT DOCUMENTS

DE 202018100262 U1 1/2018
FR 2549517 A1 1/1985

(Continued)

OTHER PUBLICATIONS

Sep. 27, 2023 Search Report issued in International Patent Application No. PCT/EP2023/064760.

(Continued)

*Primary Examiner* — Mark A Williams
(74) *Attorney, Agent, or Firm* — Oliff PLC

(57) ABSTRACT

A holding device holds a pivotally mounted door element closed and releases the door element, includes a locking unit with force transmitter, having a connection part, and locking mechanism reaching a holding position and the holding device connects to a locking element, and release position, wherein the locking mechanism releases and the holding device disconnects from the locking element. The locking element includes at least partially magnetic or ferromagnetic material, mounting part with mounting body and holding lever with body, the mounting body connects to the door element and connects by lever joint to the lever body including a front piece, holding at least one magnet, wherein the holding position force-lockingly connects to the locking element, and coupling unit with a single or multi-part coupling body which distanced from the lever joint pivotally (Continued)

Figure 1:
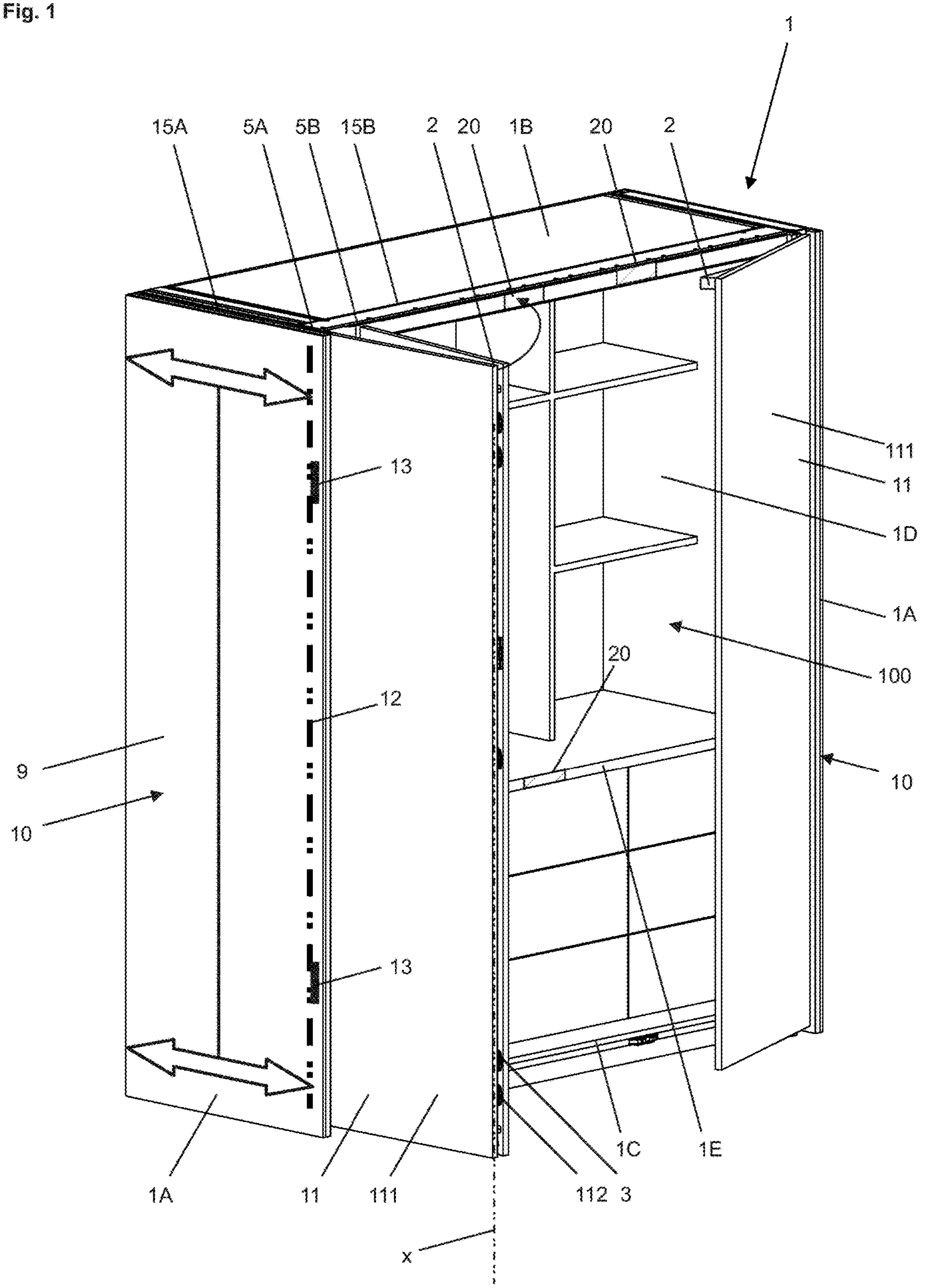

connects to the mounting body and pivotally connects to the lever body and locking unit connection part.

15 Claims, 14 Drawing Sheets

(56) References Cited

U.S. PATENT DOCUMENTS

| | | | | | |
|---|---|---|---|---|---|
| 5,809,613 | A * | 9/1998 | Baines | E05F 5/00 | 16/82 |
| 5,823,026 | A * | 10/1998 | Finke | E05B 47/0002 | 70/279.1 |
| 5,921,117 | A * | 7/1999 | Illguth | E05B 17/0037 | 292/179 |
| 9,284,761 | B2 | 3/2016 | Haab et al. | | |
| 2005/0268432 | A1 | 12/2005 | Migli | | |
| 2007/0029808 | A1* | 2/2007 | Wang | E05F 15/643 | 292/1 |
| 2008/0265588 | A1* | 10/2008 | Carabalona | E05C 3/16 | 292/251.5 |
| 2010/0281934 | A1* | 11/2010 | Su | E05B 65/0082 | 70/278.1 |
| 2011/0225890 | A1* | 9/2011 | Greenwood | E05B 65/0007 | 49/394 |
| 2015/0308155 | A1* | 10/2015 | Eller | E05B 47/0012 | 292/143 |
| 2017/0247924 | A1 | 8/2017 | Gabl | | |
| 2018/0119470 | A1* | 5/2018 | Kohlweiss | E05D 15/58 | |
| 2018/0155972 | A1* | 6/2018 | Filges | E05C 19/165 | |
| 2022/0372808 | A1 | 11/2022 | Fink et al. | | |
| 2023/0160234 | A1* | 5/2023 | Tinker | E05B 47/026 | 70/277 |

FOREIGN PATENT DOCUMENTS

| | | | |
|---|---|---|---|
| JP | 2011-162994 | A | 8/2011 |
| WO | 2021/119691 | A1 | 6/2021 |

OTHER PUBLICATIONS

Sep. 27, 2023 Written Opinion of the International Searching Authority issued in International Patent Application No. PCT/EP2023/064760.

* cited by examiner

HOLDING DEVICE FOR A DOOR AND FUNCTIONAL ENTITY WITH A HOLDING DEVICE

The invention relates to a pressure-operated holding device for a door, in particular for a foldable door or foldable sliding door, and to a functional entity, in particular a piece of furniture, which is provided with a door, in particular with a foldable door or foldable sliding door, and with at least one holding device.

To close off functional entities, for example openings of rooms or pieces of furniture, doors are used, usually foldable doors or foldable sliding doors, which are preferably moved into a door compartment or parking space after the opening has been cleared so that they do not appear disturbing.

U.S. Pat. No. 9,284,761B2 discloses a piece of furniture with a displacement device by means of which a mounting profile connected to a foldable sliding door is displaceable within a door compartment. The foldable sliding door comprises two door elements, of which the first door element is connected at the rear by mounting hinges to a mounting profile and at the front by foldable-door hinges to the rear of a second door element, which is connected at the front to a guide carriage, which is displaceable along a guide rail, which comprises two rail sections aligned perpendicularly to one another and connected to one another by a curved section, of which a first rail section extends into the door compartment and a second rail section extends along the front of the piece of furniture. The mounting profile is held in vertical alignment by a supporting device and is provided on the upper side and the lower side with guide carriages that are displaceably supported in guide rails.

To close the piece of furniture, the foldable door is rolled out of the door compartment and unfolded. In the closed position, the door elements are aligned planar to each other. To open the piece of furniture, the foldable door is folded again, whereby the door elements are driven in an open position preferably aligned parallel to each other into the door compartment.

In the closed position, the foldable door must be kept in a planar orientation so that a folding process is not automatically initiated. After opening the foldable door from the closed position, it would be desirable if the folding process was carried out automatically.

DE202018100262U1 discloses a pressure-actuated holding device that assists in both holding the foldable door in the closed position and folding the foldable door after the foldable door is released from the closed position. This device comprises a first fitting member connected to the first door element of the foldable door and a second fitting member connected to the second door element of the foldable door. Between the first fitting member and a coupling device arranged on the second fitting member there is an ejector element which is movably connected to the first fitting member and the coupling device. An adjustment of the first fitting member relative to the coupling device takes place via a force accumulator which is to be loaded manually by the user and which acts against the ejector element. A release device is connected to the second door leaf via a connecting cable. The release of the locking device is affected by applying pressure to the planar aligned door elements, which pushes them further in the closing direction out of the planar alignment.

This device has a complex structure and requires numerous device parts, of which a first group is to be connected to the first door element and a second group to the second door element. Furthermore, device parts are provided which connect the two fitting members and thus the two door elements to each other and of which first device parts are mechanically guided, and second device parts are loosely held with corresponding effort, which is usually undesirable. Moreover, the door elements of the foldable door are held in the closed position solely by the holding device. Hence, measures are required to counteract accidental unlocking. Due to the use of two fitting parts, it must also be ensured that they are connected to the first and second door element at the correct distance from each other and in correct mutual alignment and height. It should also be noted that this device takes up a lot of space, which is disadvantageous given the limited space within the piece of furniture and especially within a door compartment.

Furthermore, the holding device is only suitable for use with foldable doors, so that for doors with only one door element a different holding device is required.

US2022372808A1 discloses an ejection device with two levers that can be pivoted relative to each other and can be locked against each other by means of a locking device.

US20180119470A1 discloses a further ejection device comprising at least one ejection element for opening a foldable door.

US20170247924A1 discloses an ejector device for opening a foldable door.

The present invention is therefore based on the object of creating an improved holding device by means of which the door of a functional entity, a single door or a foldable door, optionally a foldable sliding door, can be held in a closed position.

Furthermore, an improved functional entity, in particular a piece of furniture, with at least one door element shall be created, which is equipped with at least one such holding device.

The holding device shall allow to releasably hold a door of a functional unit, a single door or a folding door, if applicable a folding sliding door, in a closed position and to release it again.

The holding device shall have a simple design and comprise as few device parts as possible so that the holding device can be manufactured and assembled with little effort and at low cost.

The holding device shall also be realised with small dimensions, so that the holding device in the closed position when the single door is closed or when the door elements of the foldable door are aligned in a plane and also in the open position when the door elements of the foldable door are aligned parallel side by side takes up only little space. The usable space available to the user should therefore be optimised in that the holding device does not protrude far into the usable space and in that a door compartment for the held door can be realised with the smallest possible dimensions.

The holding device shall easily be mountable in the functional entity. Mutual alignment of fixture parts shall be avoided or at least significantly simplified.

The holding device shall reliably hold the door, possibly the foldable door, in the closed position without additional measures and support the opening process, possibly the folding process, after the door has been released from the closed position.

This task is solved with a holding device according to claim 1 and a functional entity, possibly a piece of furniture, according to claim 12, which is equipped with at least one such holding device. Advantageous embodiments of the invention are defined in further claims.

The holding device, which is provided for holding a pivotally mounted door element in a closed position and for releasing the door element from the closed position, comprises a locking unit with a force transmitter, having a connection part, and a locking mechanism, which locking mechanism by the application of pressure is cyclically transferable between a locking position, in which the locking mechanism reaches a holding position and the holding device is connectable or connected to a locking element, and a release position, in which the locking mechanism reaches a release position and the holding device is disconnectable or disconnected from the locking element.

According to the invention the locking element consists at least partially of magnetic or ferromagnetic material, a mounting part with a mounting body and a holding lever with a lever body are provided, the mounting body is connectable to the door element and is connected by a lever joint to the lever body, the lever body comprises a front piece, which holds at least one holding magnet, which in the holding position is force-lockingly connected or connectable to the locking element, and a coupling unit is provided with a single-part or multi-part coupling body which on the one hand distanced from the lever joint is pivotally connected to the mounting body and on the other hand is pivotally connected to the lever body and is pivotally connected to the connection part of the locking unit.

The holding lever is preferably turnable around a lever axis of the lever joint in relation to the mounting part. During this process, the coupling body of the coupling unit, which is preferably plate-shaped, is turned. By turning the coupling body, which takes place when the holding lever is actuated, a force is transmitted from the coupling body to the connection part of the force transmitter and the locking unit is cyclically actuated step by step with each actuation of the holding lever.

Preferably, at least one reset spring is provided, which acts directly or indirectly on the force transmitter or on the coupling unit and automatically returns the locking unit from the holding position to the release position. The reset spring can also act on the mounting part on the one hand and on the holding lever on the other hand. Since the force transmitter, the coupling unit and the mounting part as well as the holding lever are coupled together, the reset spring can act on any of these parts to return the force transmitter or to turn the mounting part and the holding lever relative to one another. The reset spring can be arranged coaxially to the force transmitter and for example be in the form of a coil spring. The reset spring can also surround the central shaft with several coils and act with a first end piece on the mounting part and a second end piece on the holding lever to rotate them apart. In preferred embodiments, a first reset spring acting on the force transmitter and/or a second reset spring acting on the mounting part and the holding lever and preferably enclosing the central shaft are provided.

Thereby the locking mechanism can be closed and opened cyclically and the force transmitter, which is supported by the reset spring, is moved back and forth by the required amount. The locking mechanism is released by pushing the force transmitter beyond a rest position. Subsequently, the released force transmitter of the reset spring is pushed back and a torque is exerted on the holding lever via the coupling body, by means of which the holding lever is released from the magnet and the separating element connected to the holding device can be returned from the closed position.

In preferred embodiments, it is provided that the coupling body is connected to a lever shaft, which is held by the lever body, and to a mounting shaft, which is held by the mounting body, and that the coupling body is hinged to the connection part of the locking unit by means of the lever shaft, by means of the mounting shaft or by means of a preferably provided coupling shaft. The actuating force can therefore be transmitted from the coupling body to the force transmitter in various ways. The lever shaft and/or the mounting shaft and/or the coupling shaft are preferably aligned parallel to each other.

The force transmission between the mounting body and/or the lever body and/or the connection part can be effected by any complementary connecting parts or coupling parts, such as hooks, cams, recesses and the like. The coupling body itself preferably consists of one piece, preferably a plate, but can also consist of two or more parts. For example, the coupling body forms a lever or lever mechanism with a first lever part and a second lever part. The first lever part is for example connected on one side to the mounting shaft and on the other side to the coupling shaft. The second lever part is for example connected to the lever shaft on one side and to the coupling shaft on the other side. The two lever parts therefore preferably form a toggle joint which acts on the force transmitter or the connection part and pushes it back when the holding lever is turned against the mounting part. Hence, it is sufficient if the coupling shaft or a part connected to it acts on the connection part of the force transmitter.

In particular, if an additional coupling shaft is omitted and only the lever shaft held by the lever body and the mounting shaft held by the mounting body are provided, it is preferably provided that the lever shaft in the lever body is held in a guide track and pivotally connected to the connection part of the locking unit, or that the mounting shaft in the mounting body is held in a guide track and pivotally connected to the connection part of the locking unit. The lever shaft or mounting shaft held in the guide track is therefore positively guided to operate the locking unit cyclically.

The holding device is advantageously constructed with only a few fixture parts and can thus be manufactured inexpensively and assembled easily.

The holding device can advantageously be mounted on only one door element, possibly on a door element of a foldable door or foldable sliding door. It is therefore not necessary to mount device parts on a first and on a second door element, to correctly align and position them against one another and to connect them to one another. Further, the mounting of the holding device itself on the associated door element is not critical and can be carried out with simple measures. It is only necessary to ensure that the holding magnet of the holding device can interact with the stationary magnetic or ferromagnetic locking element in the closed position of the door, possibly the foldable door. The holding device is therefore universally applicable and can also be retrofitted to already installed functional entities or pieces of furniture. Furthermore, it is possible to arrange the holding device in a stationary position and to connect it, for example, to the body of the functional entity, while the locking element is connected to the door element.

The locking unit, which is preferably arranged inside the mounting part or inside the holding lever, is preferably cylindrical. The force transmitter is preferably an actuating piston, which is preferably axially guided in a cylindrical housing. However, the force transmitter can also be rod-shaped or comprise another form.

The mounting part and the holding lever can preferably be inserted into each other, so that the holding device in the closed position or in a parking position, in which the door elements of a foldable door are folded against each other, takes up only little space, which is essentially determined by the dimensions of the locking unit.

Preferably, the mounting body is at least partially U-shaped and comprises two side walls connected to each other by a central body piece, which delimit a receiving chamber in which the locking unit is completely or partially accommodated and held in a force-fitting or form-fitting manner. Alternatively, the locking unit can also be arranged in the holding lever. When the locking unit is arranged within the U-profile-shaped mounting body and a coupling shaft is avoided, each of the side walls preferably comprises a guide track, so that the mounting shaft is securely guided on both sides in the two guide tracks, which lie opposite each other and run parallel to each other. When the locking unit is arranged inside the U-profile-shaped lever body and a coupling shaft is avoided, each of the side members of the lever body preferably comprises a guide track so that the lever shaft is securely guided on both sides in the two guide tracks that are opposite and parallel to each other. The mounting shaft and/or the lever shaft and/or the coupling shaft are preferably held and/or guided on both sides.

The guide track or guide tracks comprise a straight or curved path. Preferably, the guide tracks comprise a V-shaped path with the ends facing the coupling unit. This ensures that a high force can be transmitted to the force transmitter during the closing process. At least the track section of the guide tracks, which is passed through by the mounting shaft or lever shaft at the beginning of the closing process, is therefore preferably inclined with respect to the longitudinal axis of the mounting part. The angle of inclination of this track section is preferably around 45°. The track section of the guide tracks that the mounting shaft passes through first during the opening process is preferably also inclined, resulting in a greater track length without taking up more space in the axial direction.

The length of the guide tracks is preferably chosen in such a way that the force transmitter can be moved beyond the locking position into a transitional position, at least when the second pressure is applied. This allows the foldable door to be pushed beyond a rest position in the closing direction in order to engage or disengage a retaining element from the anchorage.

Preferably, the force transmitter is supported within the locking unit by a reset spring, which counteracts the pressure effect of the coupling body on the force transmitter and, after it has been released from the locking position and transferred into the transitional position, automatically moves the force transmitter back into the release position, in which the holding lever is swivelled out relative to the mounting part.

The corresponding force for the mutual rotation of the mounting part and of the holding lever can also be exerted by an external force source. In preferred embodiments, another spring element can also act on the mounting part and the holding lever. For example, a spring, such as a helical spring, is arranged in the area of the central shaft and/or remote from the central shaft. Furthermore, a leaf spring can be provided between the mounting part and the holding lever.

The locking unit is preferably adjustable and comprises an adjustment member with an engagement element, which can be actuated by means of a tool that can preferably be inserted into the receiving chamber through an adjustment channel provided in the mounting body. By means of the tool, for example, the reaching of the locking position or the transitional position can be adjusted.

The connection part is of simple or preferably U-profile shape with one or two or two connection plates each provided with a connection track, between which the part of the coupling body provided with the mounting shaft or the lever shaft or the coupling shaft is held. The mounting shaft, lever shaft or coupling shaft is therefore preferably guided on both sides by a connection track in the connection part and by a guide track in the mounting body or in the lever body, so that no torsional forces act on the mounting shaft, lever shaft or coupling shaft and the coupling unit. A compressive force acting on the holding device can therefore be transmitted to the locking unit without significant losses. Likewise, the locking unit can transmit forces back via the force transmitter during the opening process with minimal losses.

The connection track or the connection tracks give the mounting shaft or the lever shaft the freedom to follow the guide track or the guide tracks, even if they are not linear. When moving the force transmitter, a blockage of the mounting shaft, the lever shaft or the coupling shaft is therefore always avoided.

The lever body is preferably at least partially U-shaped and comprises two side walls connected to each other by a central body piece, which delimit a lever chamber into which the mounting part can be fully or partially inserted.

In a preferred embodiment, the lever body comprises a tool channel through which a tool part can be guided in order to actuate a mounting screw guided through the mounting body. This allows the holding device to be advantageously mounted and dismounted.

On the front piece facing away from the central shaft, the lever body of the holding lever preferably holds at least one spacer roller. For example, the front piece is fork-shaped and has a bearing shaft passing through it, by means of which one or more spacer rollers are held. The spacer rollers ensure that the front piece of the holding lever cannot collide with a part of the piece of furniture in the closed position and with the adjacent door element in the parked position after folding the foldable door. The spacer rollers are preferably dimensioned in such a way that the holding magnet cannot touch the locking element.

In a further preferred embodiment, the lever body comprises a magnet chamber into which the holding magnet is sunk.

The magnet chamber is preferably adjoined by a through-opening through which a connection screw is passed, which connects the holding magnet to a threaded element, which is preferably supported on a support spring and which holds the holding magnet axially displaceable or pivotable or axially displaceable and pivotable. The threaded element preferably comprises a threaded pin which is held with play within the through-opening. The holding magnet can therefore self-align and interact optimally with the magnetic or ferromagnetic locking element even if the holding lever is not aligned parallel to the mounting part and/or the locking element. In the closed position of the foldable door, the holding lever can thus still be rotated by an angle of, for example, 1°-10° relative to the mounting part, which allows the foldable door to be pushed beyond a rest position and the holding device to be released from the holding position. The mounting shaft or lever shaft can therefore be transferred from the locking position to the transitional position, in which the mounting part and the holding lever can now effectively be aligned parallel to each other with their longitudinal axes.

After releasing the holding device from the locking position, the mounting shaft or lever shaft is moved back along the guide track or guide tracks by spring force, whereby the holding lever is turned away from the mounting part and during this process is also tilted in relation to the locking element. The holding magnet is thus lifted laterally and released from the locking element. The holding magnet is therefore not lifted frontally from the locking element, which would require a considerable amount of force, but is gradually detached by slow inclination, which is possible with little effort. The holding magnet can therefore reliably adhere to the locking element in the closed position and still be easily released from the locking element during the opening process.

The locking element is for example a ferromagnetic plate, such as a steel plate or an iron plate. The holding magnet, which is designed as a permanent magnet, is preferably a rare-earth magnet, consisting for example of ferrous metals (iron and/or cobalt and/or nickel) and rare-earth metals (in particular neodymium, samarium, praseodymium, dysprosium, terbium, or gadolinium). In principle, the locking element can also be a permanent magnet.

The locking element can be an integral part of the functional entity, possibly a piece of furniture, or can be connected to a part of the functional entity at a suitable location, for example screwed, glued or form-fittingly inserted. For example, the functional entity comprises a ferromagnetic rail or a ferromagnetic cover with which the holding magnet can magnetically interact.

Direct physical contact between the holding magnet and the locking element is not necessary and is preferably avoided by covering the holding magnet on the side facing the locking element and/or the locking element on the side facing the holding magnet with a protective layer, for example of plastic or by providing a spacing by other means. The holding magnet and/or the locking element can also be recessed in an adjacent part so that contact is excluded.

Preferably, the holding magnet is held in a magnet cup, which is preferably made of plastic and preferably projects slightly beyond the holding magnet and comes into contact with the locking element when the door is in the closed position. By the impact of the preferably elastically designed and/or elastically mounted magnet cup on the locking element, strikes and disturbing noises are avoided. The magnetic coupling of the holding magnet to the locking element, however, still results in a stable connection that holds the door securely in the closed position.

The lever body preferably comprises a magnet chamber in which the holding magnet and preferably the magnet cup are held. The holding magnet can therefore be fully recessed into the holding lever or the front piece of the holding lever without taking up additional space. The holding magnet is preferably cylindrical and held in the appropriately sized magnet chamber.

Preferably, a connection screw is inserted through a through-opening in the holding lever and into an elastic threaded element, which is preferably held in a holding chamber on the other side of the holding lever, so that it does not protrude beyond the holding lever. The threaded element preferably comprises a holding plate with a threaded pin into which the connection screw is screwed and which is preferably passed through the through-opening to the magnet chamber. Due to the play of the threaded pin within the through-opening and the flexible mounting of the holding plate by means of a support spring, the threaded pin can be tilted to the side. With the connection screw, the holding magnet can also be tilted to the side in order to automatically align itself optimally with the holding element. The preferably spiral-shaped support spring is compressed accordingly.

The functional entity, a building unit lockable by at least one door or foldable door, or a piece of furniture lockable by at least one door or foldable door, typically comprises at least one door compartment in which the folded foldable door can be parked. The functional entity may comprise, for example, a door with only one door leaf and an associated first door compartment as well as a foldable door with two door elements that can be folded against each other and a second door compartment. The functional entity can also comprise two single doors or two foldable doors.

A foldable door comprises two door elements which are connected to each other by foldable-door hinges and which are turnable against one another about a rotation axis. One of the door elements is connected to an inventive holding device in such a way that the holding magnet in the closed position of the foldable door can cooperate with the stationary held magnetic or ferromagnetic locking element which is firmly connected to a part of the functional entity or which forms a structural element of the functional entity.

The holding device is preferably mounted on the lower side or the upper side of one of the door elements and aligned parallel to the lower edge or upper edge of the associated door element and with the holding lever and the holding magnet facing the functional entity. If the locking element is mounted elsewhere, for example at half the height of the cabinet, for example on an intermediate shelf, the holding device can also be mounted at this height.

Preferably, at least one of the foldable-door hinges is equipped with a hinge spring that turns the hinge levers of the foldable-door hinges, which are connected to each other by a hinge axle, against each other so that the hinge spring is tensioned when the hinge levers are turned apart in the closed position of the foldable door. As soon as the holding device is released from the closed position, the foldable-door hinges thus support the folding process of the foldable door.

The hinge spring preferably comprises two spring packs which are connected to each other by a spring centrepiece, which enclose the hinge axle and which each rest with a spring endpiece on the first hinge lever, while the spring centrepiece rests on the second hinge lever. The spring assemblies are preferably helical or spiral.

Preferably, at least one of the mounting hinges, which is connected to a one-piece door or to a foldable door, is also equipped with a hinge spring.

The opening process of the one-piece door or the folding process of the foldable door starting from the closed position is therefore preferably supported by at least one mounting hinge and/or at least one foldable-door hinge.

The functional entity, possibly the piece of furniture, can be of any design. Preferably, the door element is connected at one edge by mounting hinges to a mounting profile which is held displaceable within a door compartment of the piece of furniture, and at an opposite edge by foldable-door hinges possibly to a second door element. The second door element is preferably connected at an edge remote from the folding door hinges to a guide carriage which is guided in a guide rail which extends along the front side of the piece of furniture and by which preferably the magnetic or ferromagnetic locking element is held.

Figure 2:
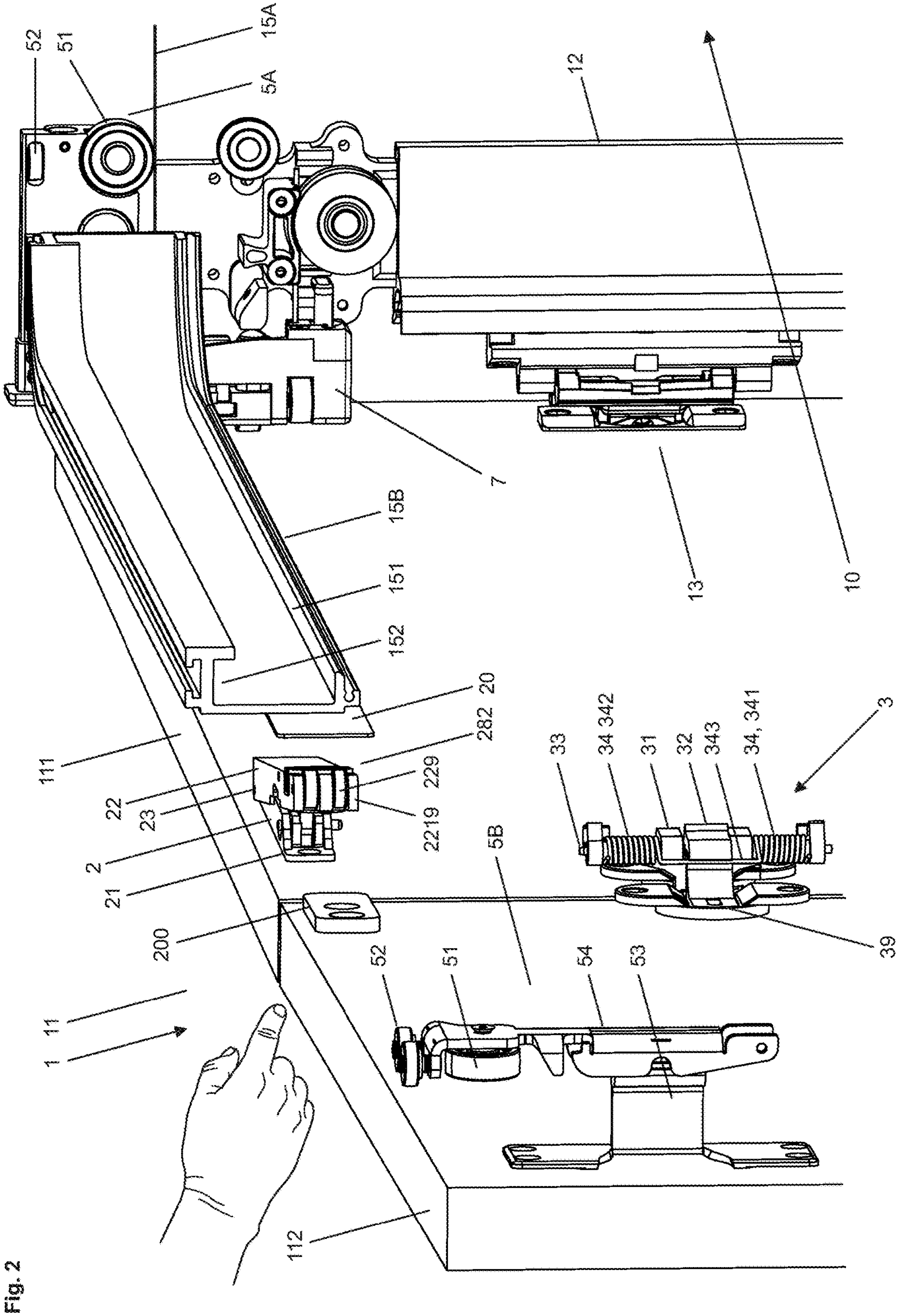
Figure 3:
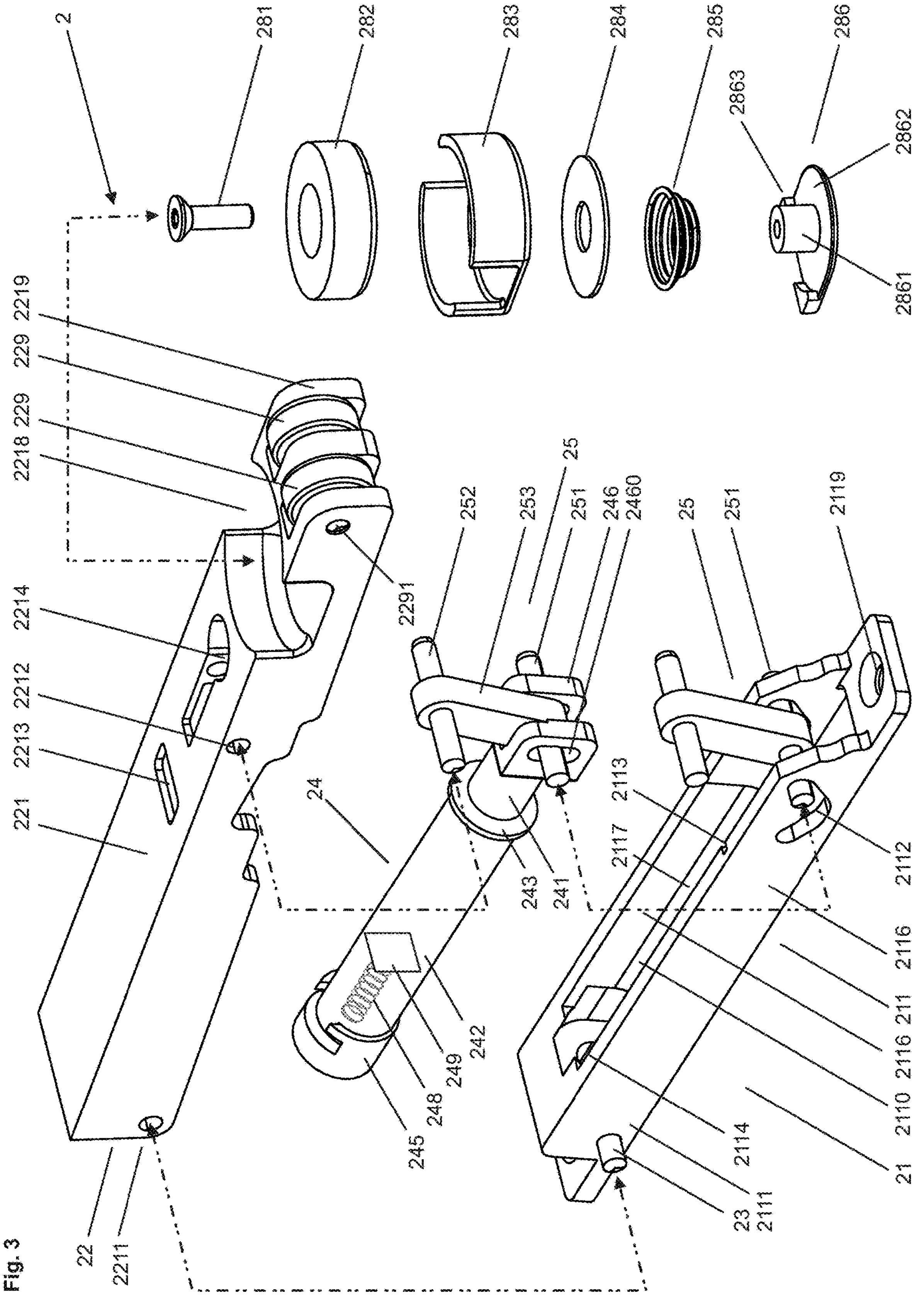
Figure 4:
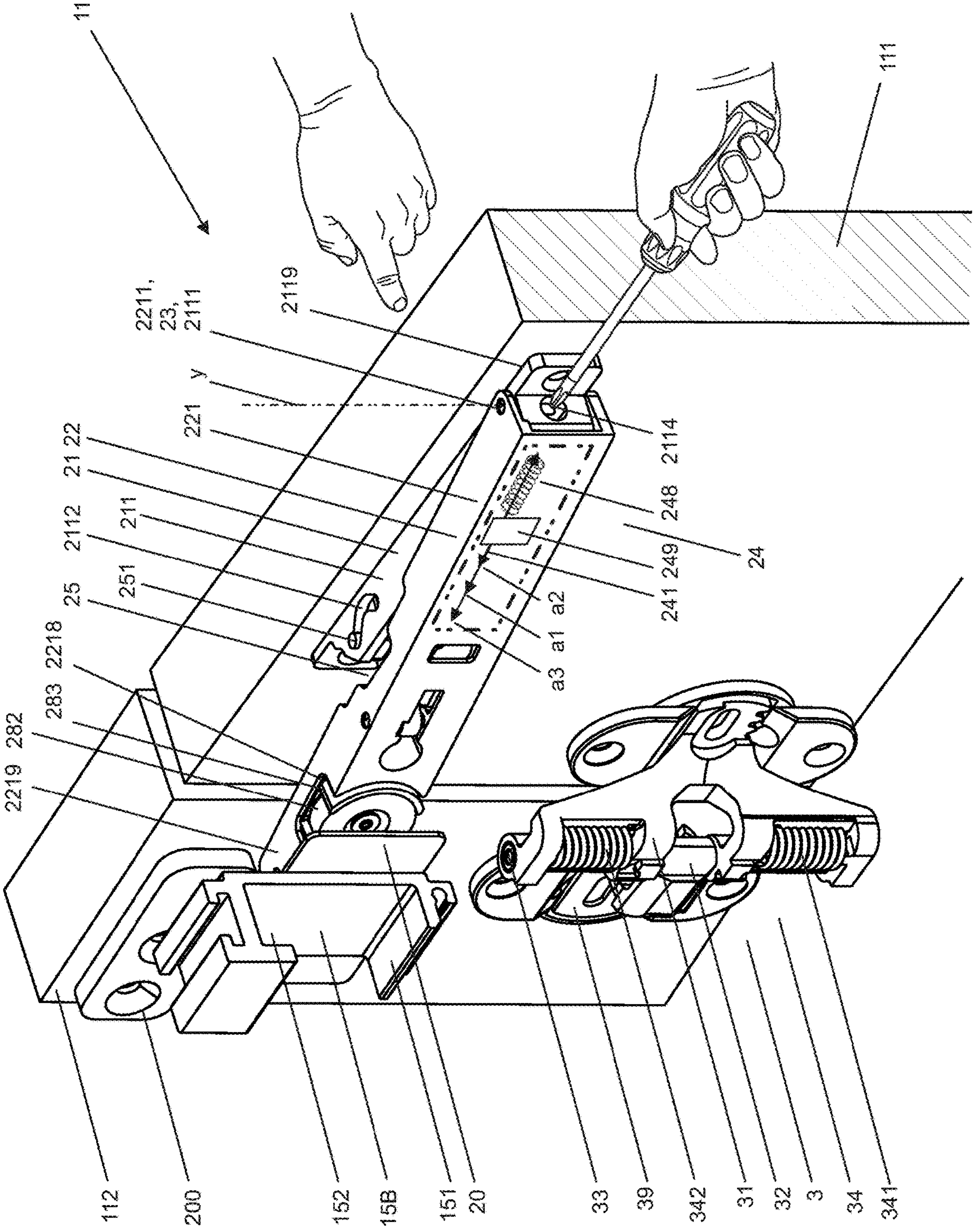
Figure 5:
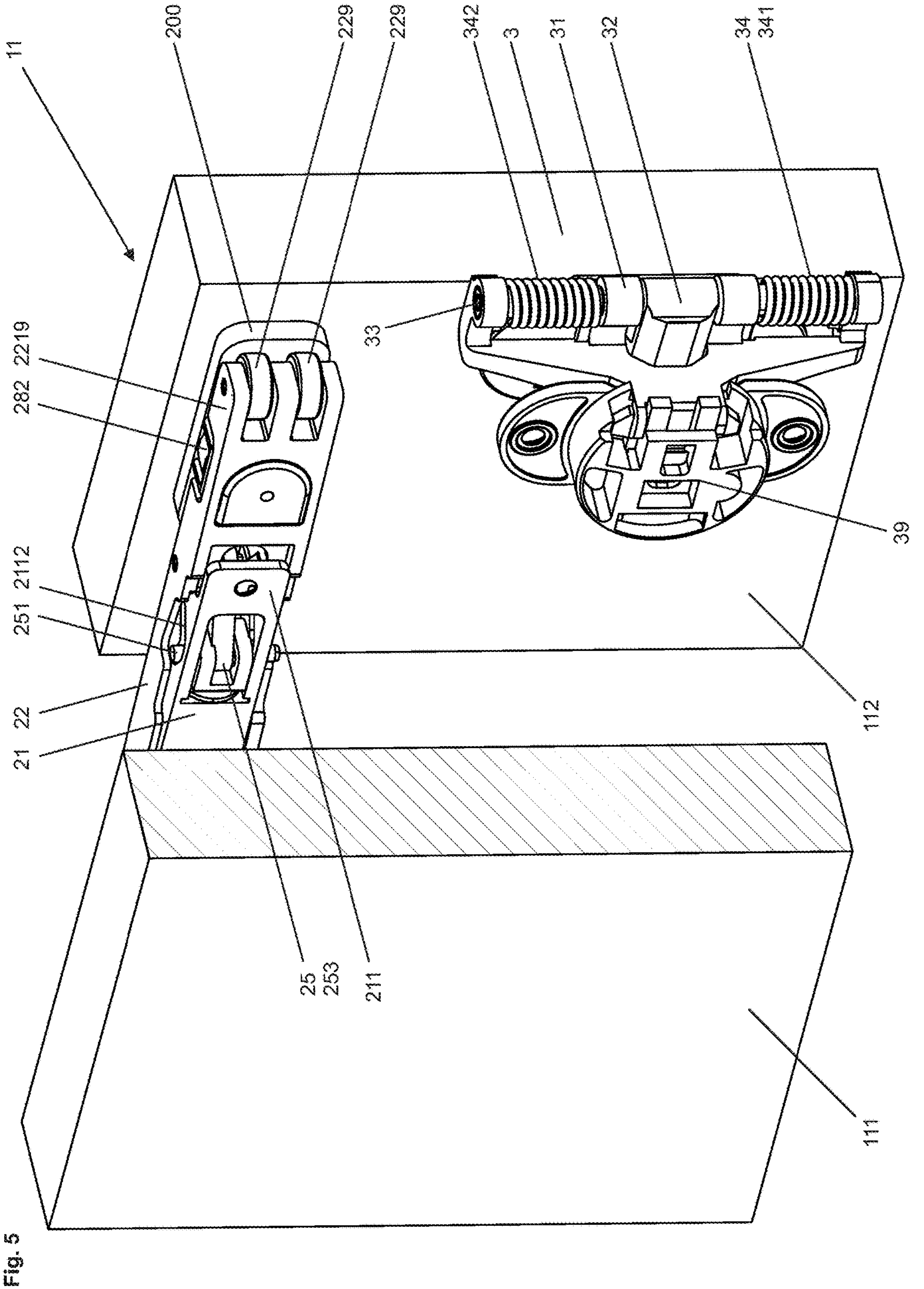
Figure 6D:
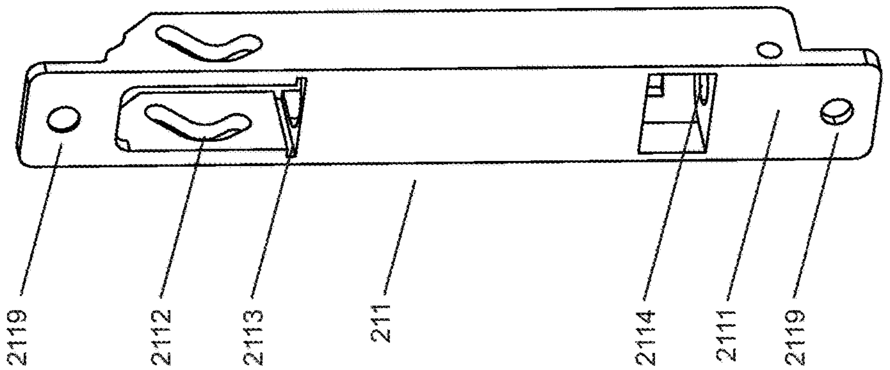
Figure 6C:
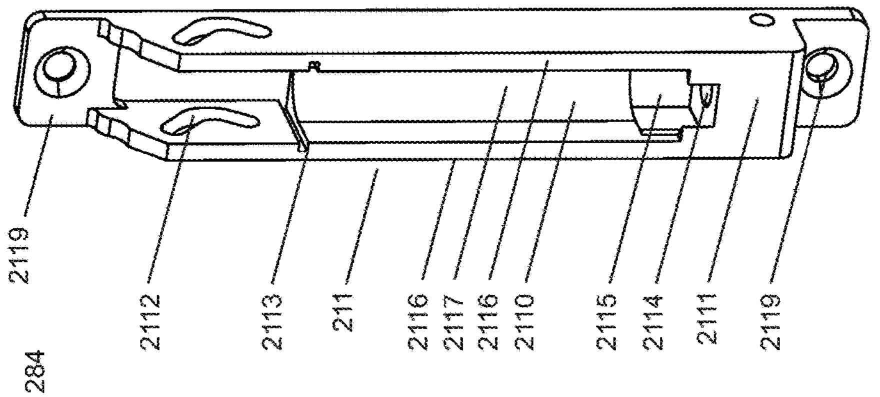
Figure 6B:
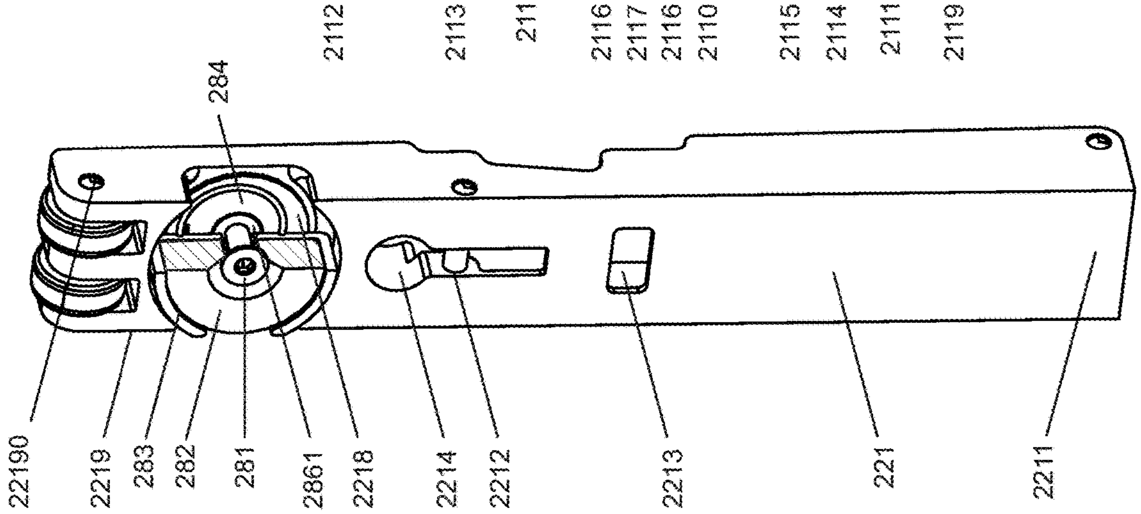
Figure 6A:
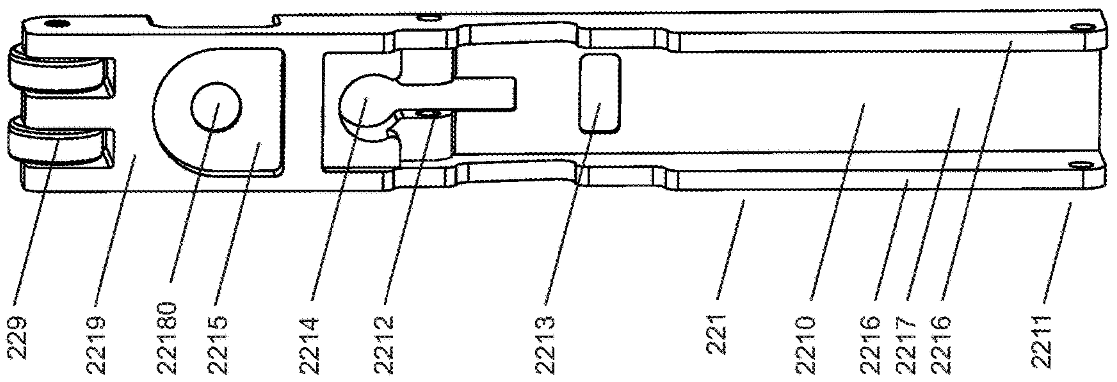
Figure 7A:
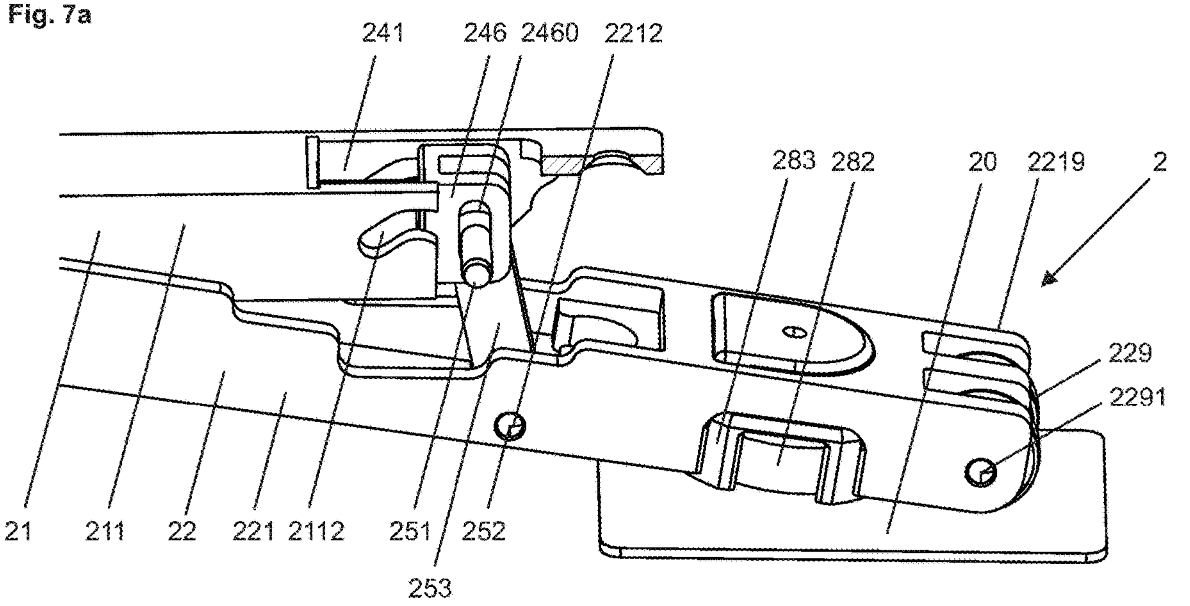
Figure 7B:
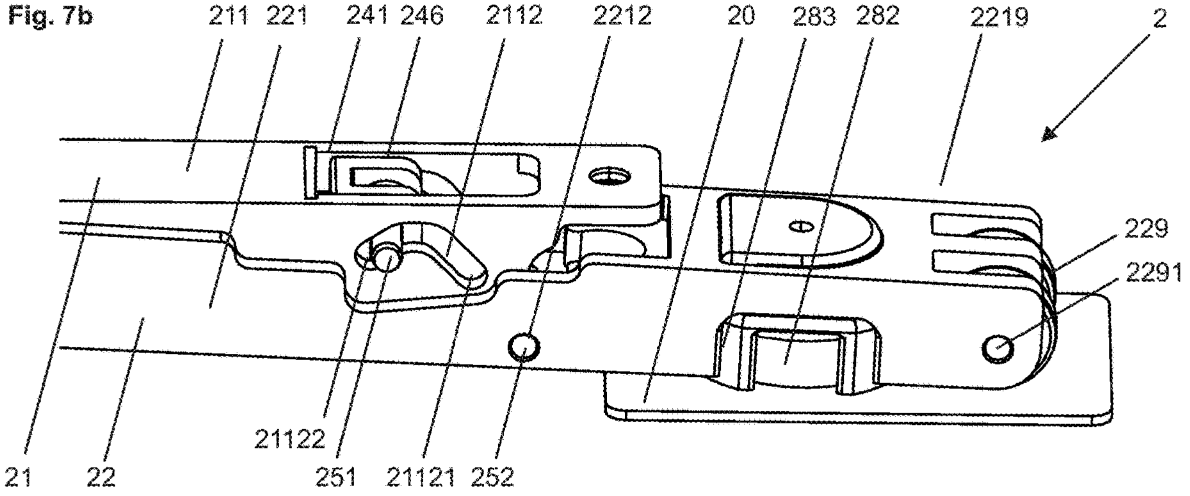
Figure 7C:
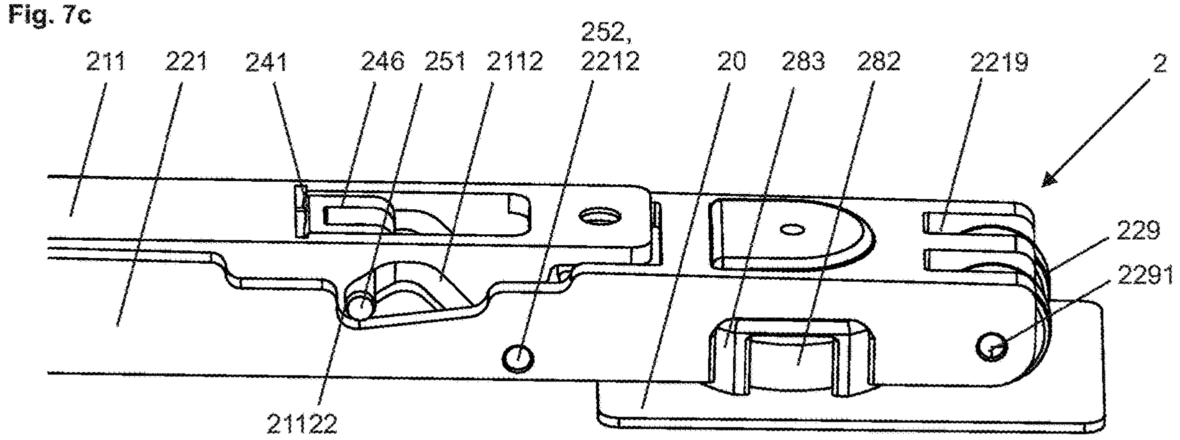
Figure 8:
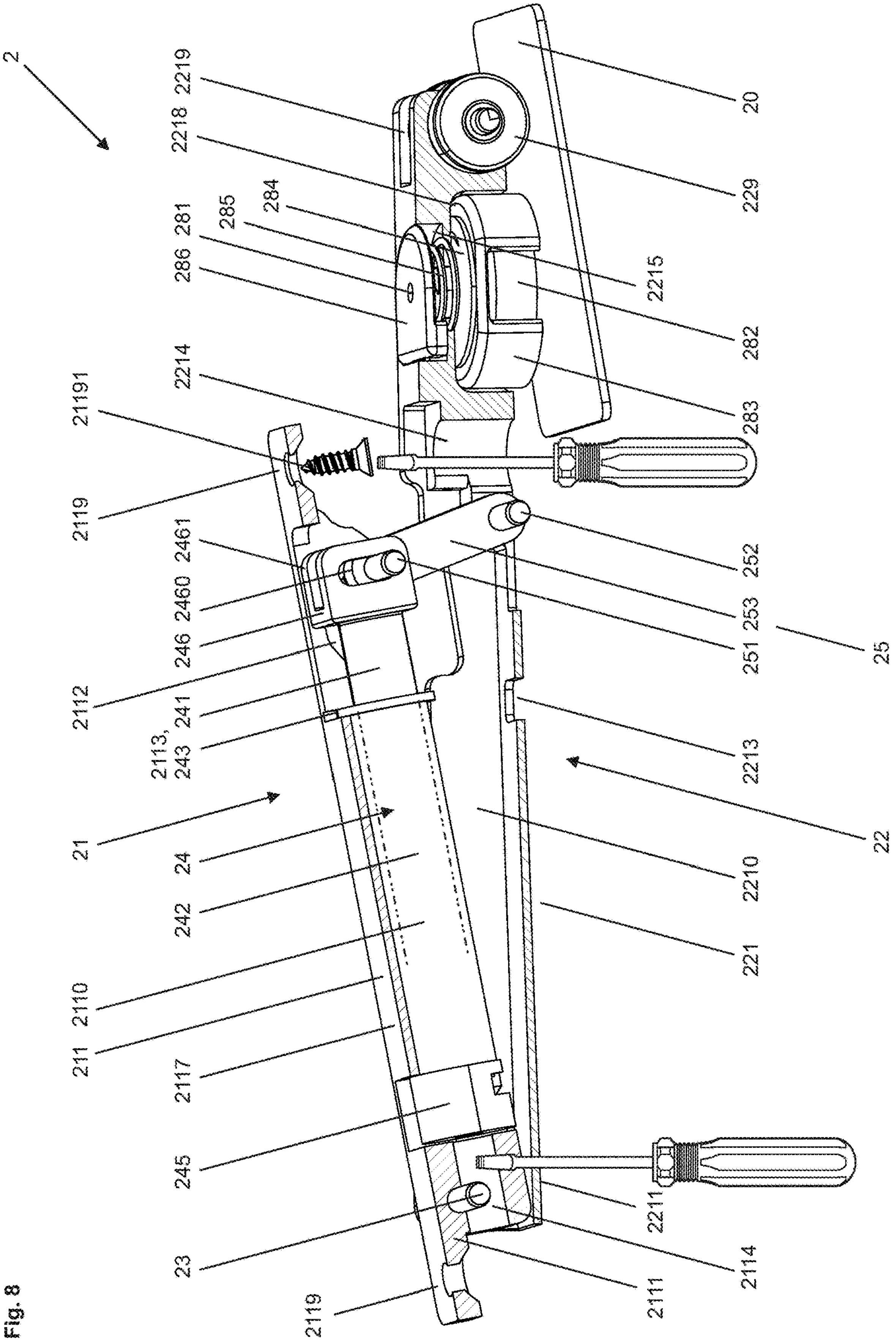
Figure 9A:
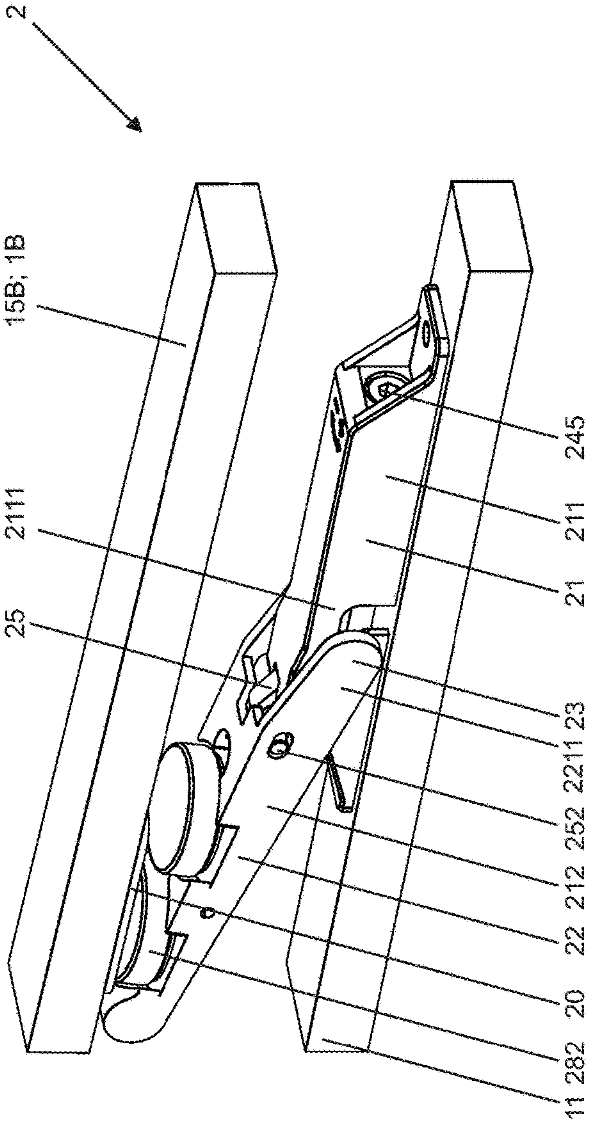
Figure 9B:
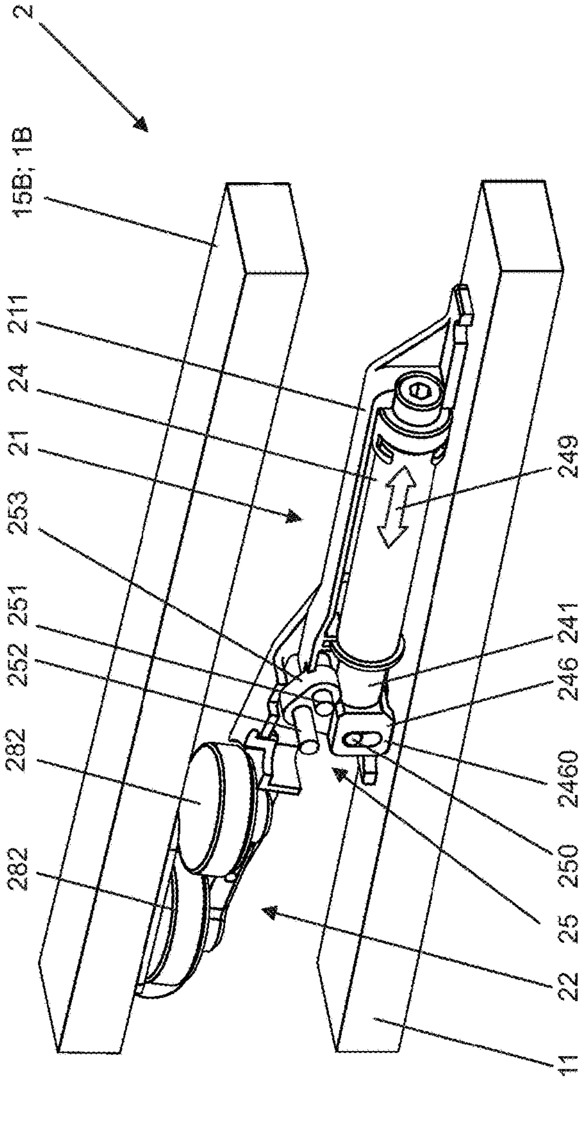
Figure 10A:
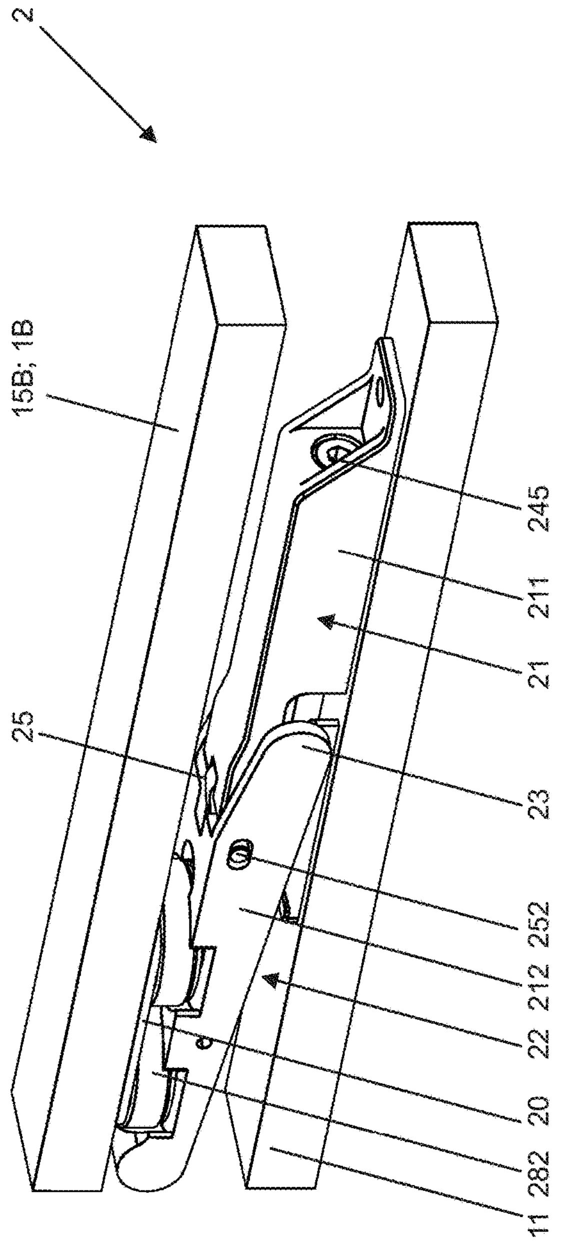
Figure 10B:
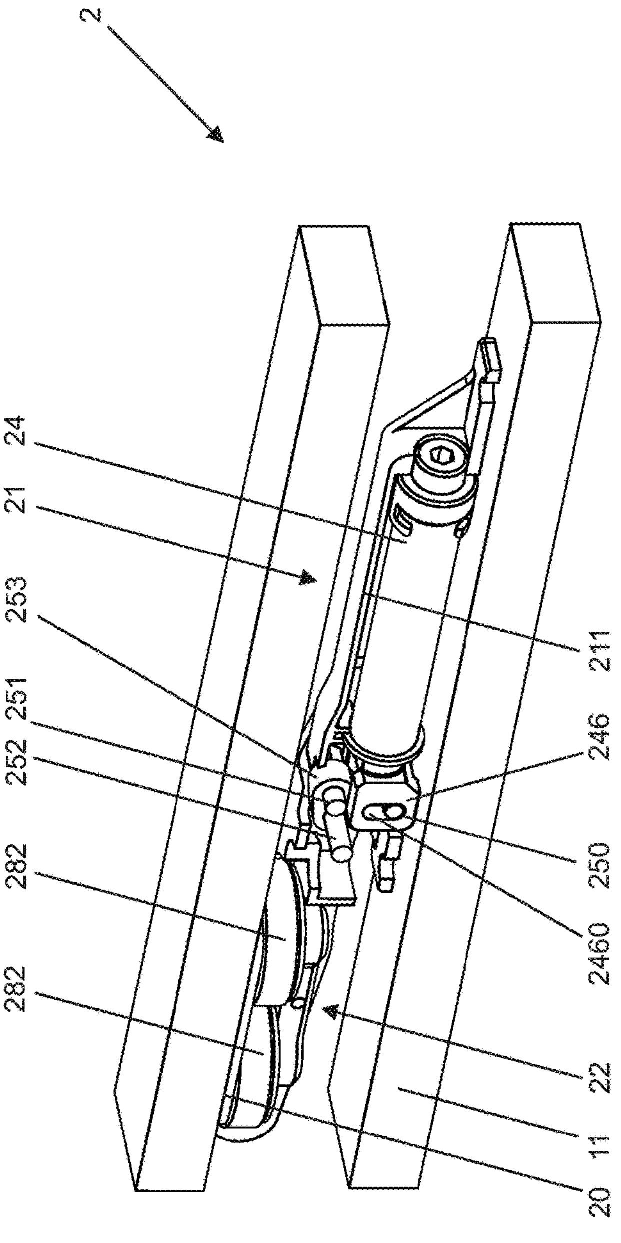
Figure 11A:
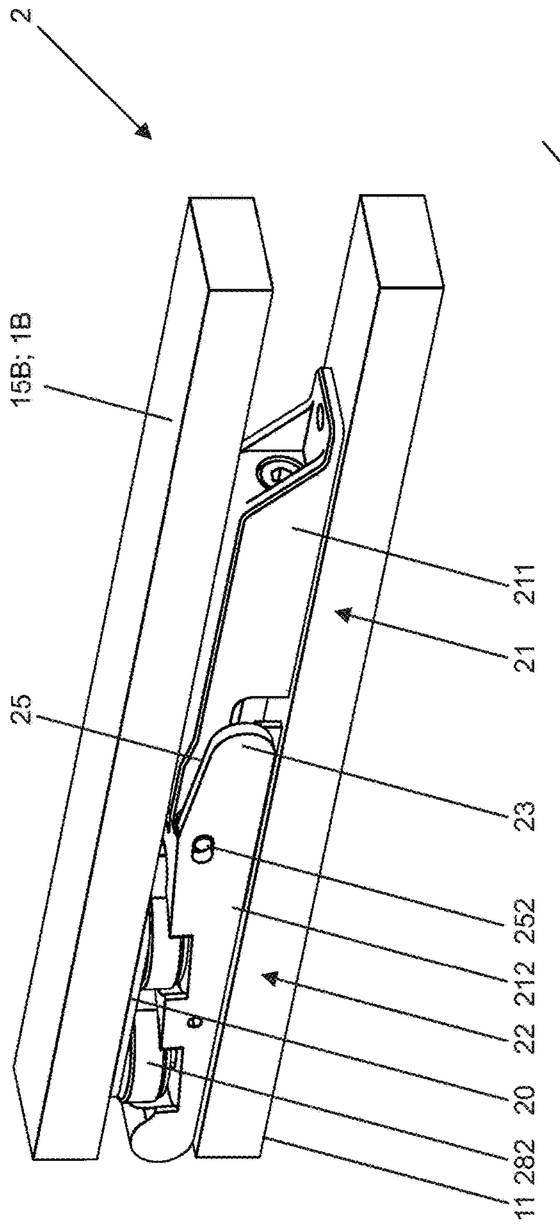
Figure 11B:
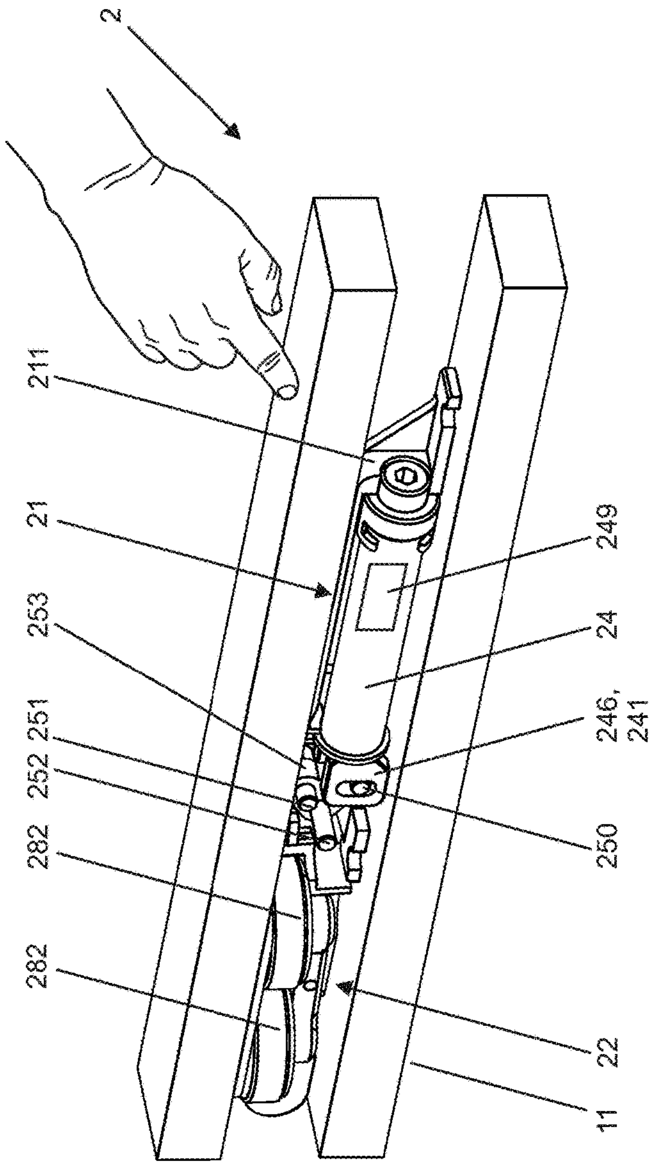
Figure 13A:
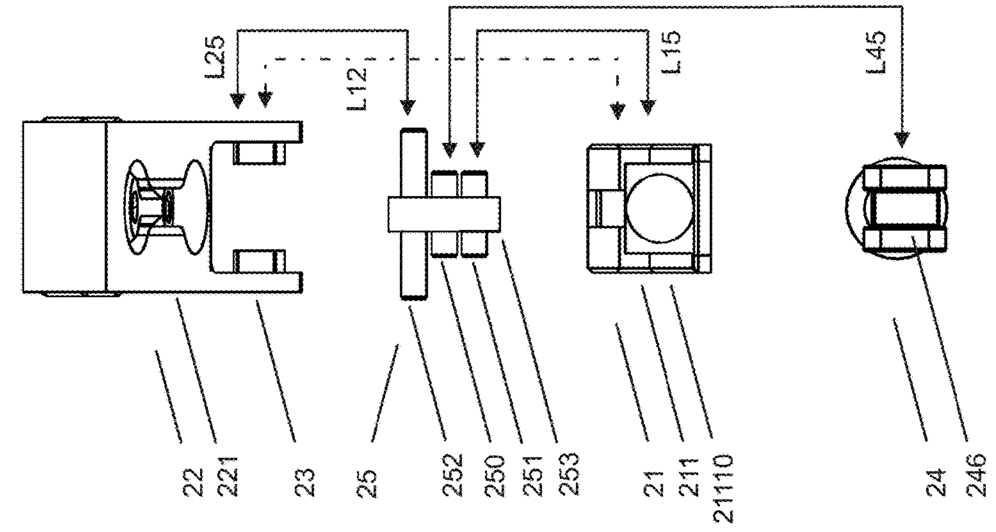
Figure 12:
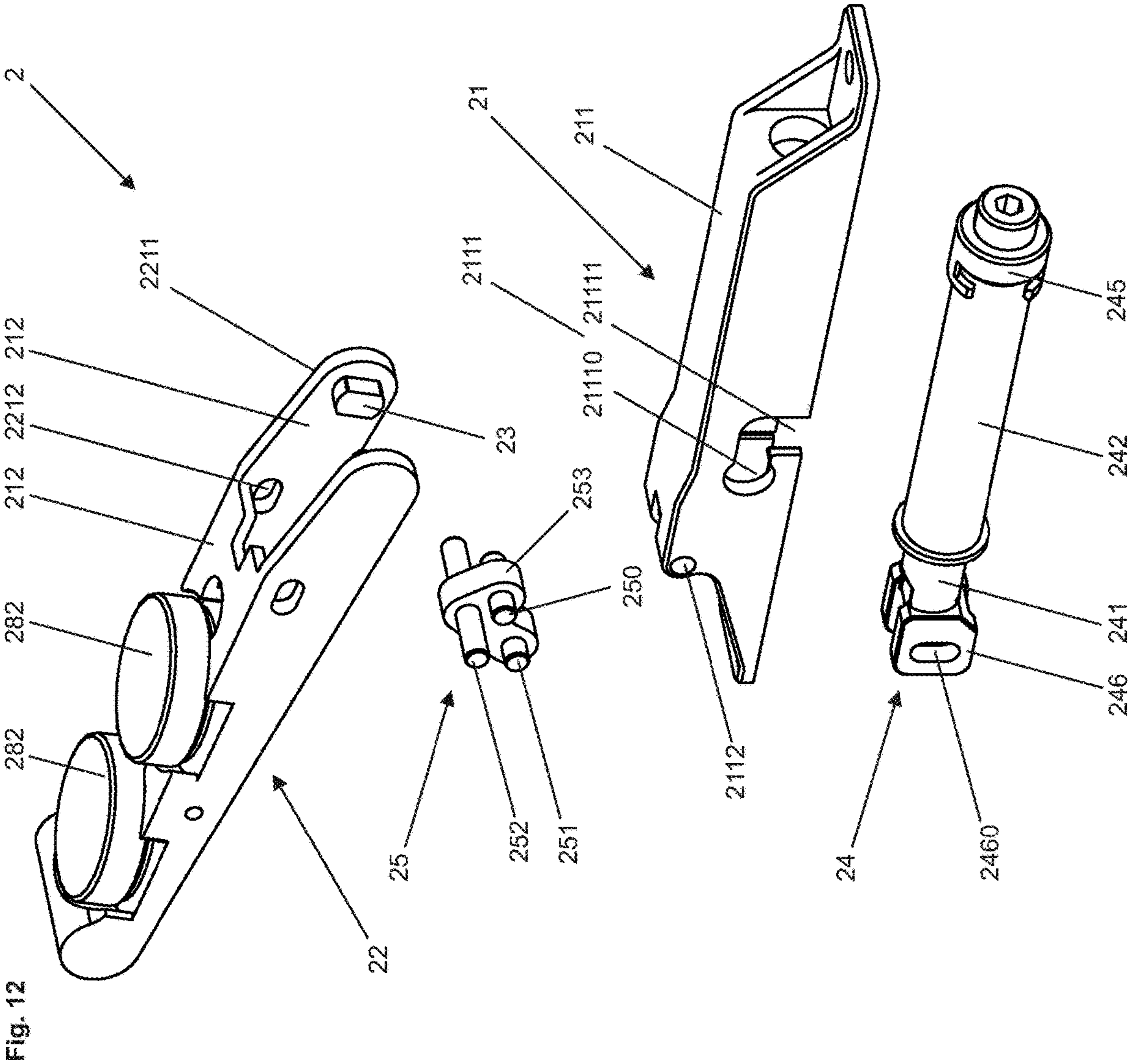
Figure 13C:
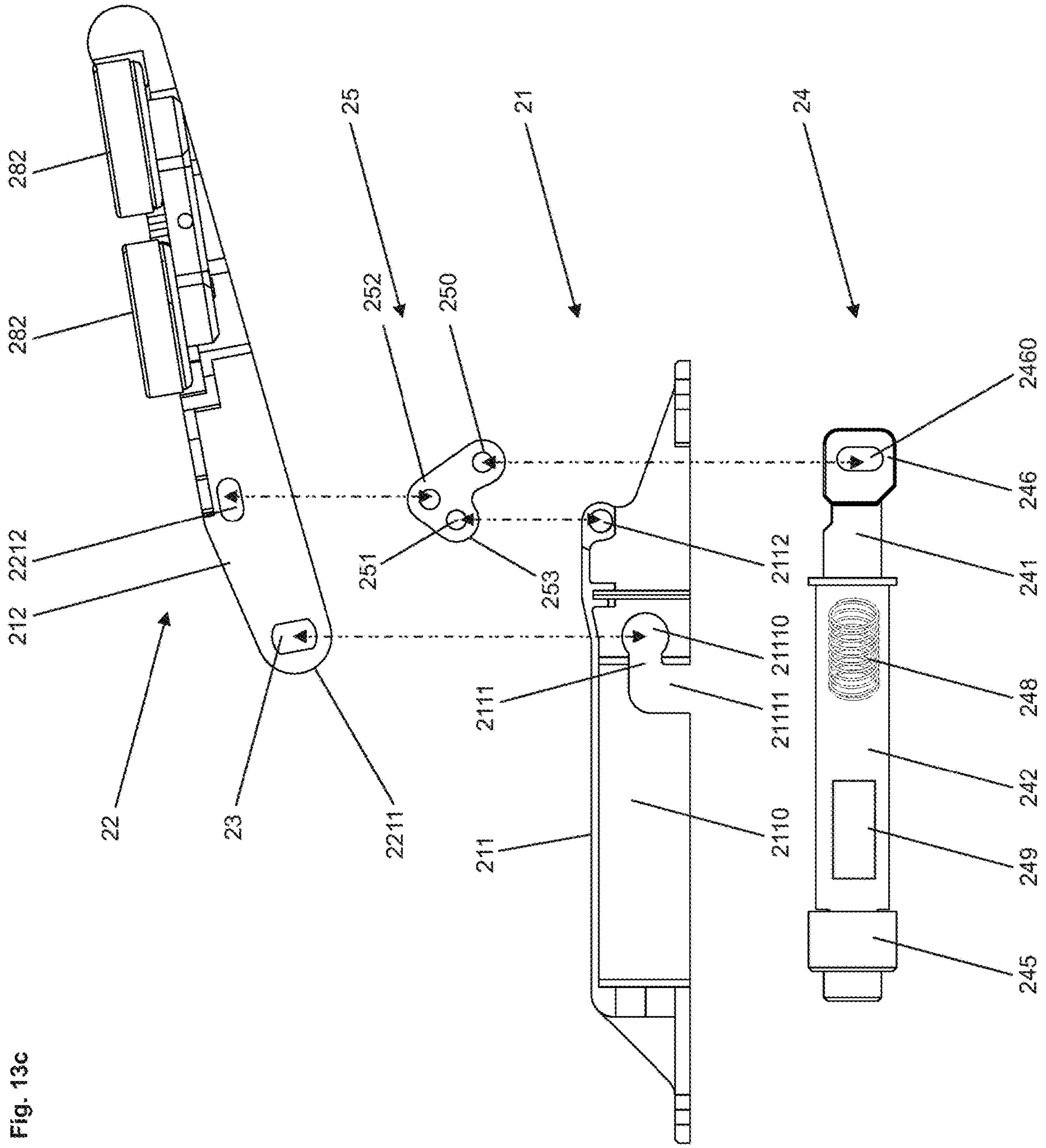
Figure 13B:
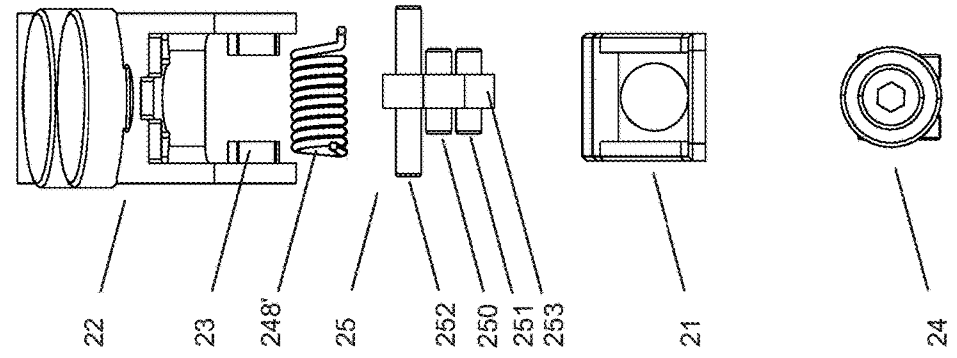
Figures 14A, 14B:
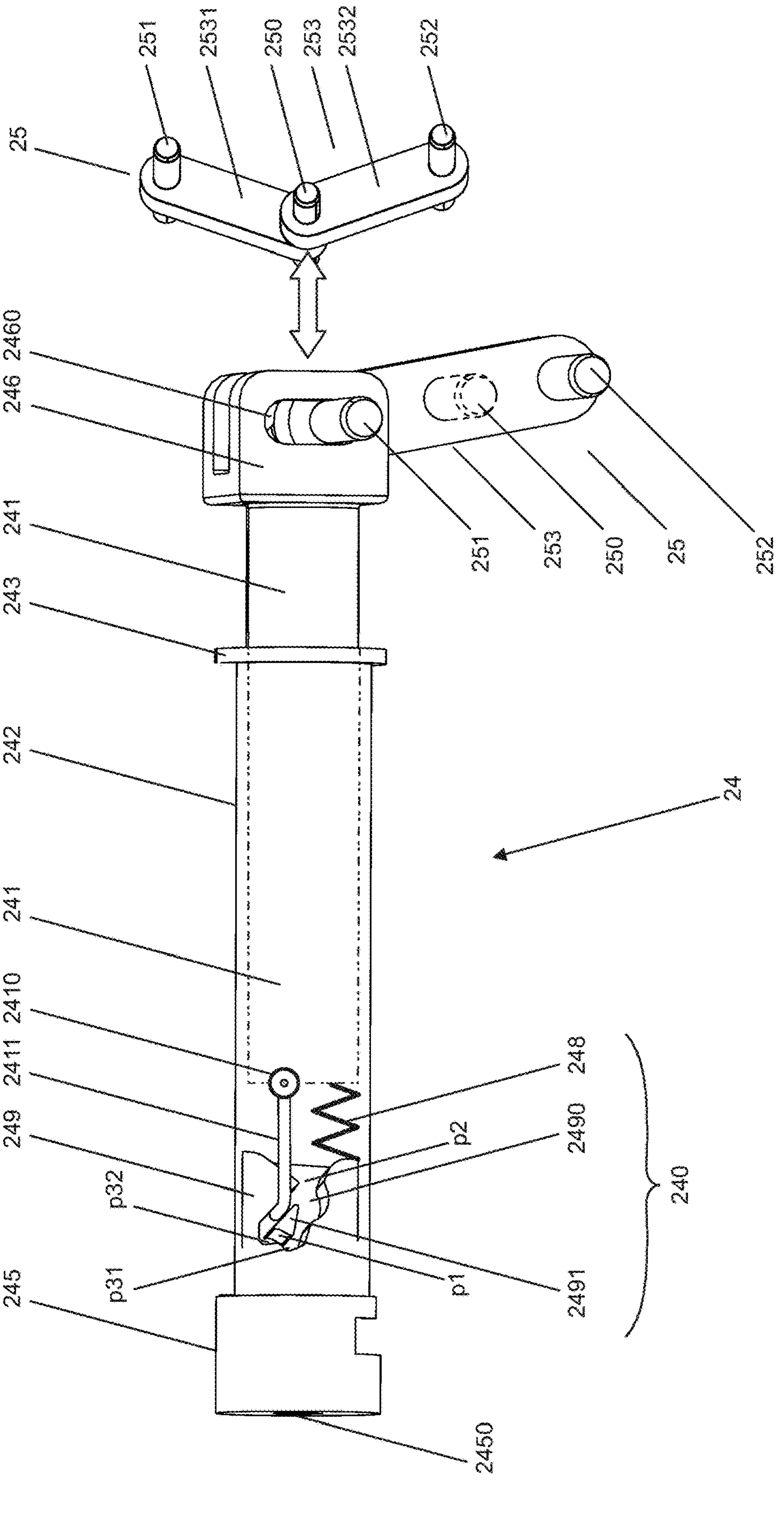

Below, the invention is explained in more detail with reference to the drawings. Thereby shows:

FIG. 1 an inventive functional entity 1 in the embodiment of a piece of furniture with a foldable door 11 which comprises two door elements 111, 112, which is equipped with an inventive holding device 2 and which can be inserted into a first door compartment 10, and with a door 11 with only one door element 111, which is equipped with an inventive holding device 2 and can be inserted into a second door compartment 10;

FIG. 2 the rear side of the foldable door 11 of the piece of furniture 1 of FIG. 1 with the first door element 111, which is connected at the trailing edge by mounting hinges 13 to a mounting profile 12 and at the leading edge by foldable-door hinges 3 to a second door element 112, on which a preferably designed holding device 2 is mounted, which comprises a holding magnet 282, which in the closed position of the foldable door 11 cooperates with a magnetic or ferromagnetic locking element 20, which is held stationary by a part of the piece of furniture 1;

FIG. 3 an exploded view of the holding device 2 of FIG. 2, which comprises a mounting part 21 with a mounting body 211, a holding lever 22 with a lever body 221, a central shaft 23 for connecting the mounting body 211 and of the lever body 221, an arrangement with a holding magnet 282, a locking unit 24 and a coupling unit 25, by means of which the mounting body 211, the lever body 221 and the locking unit 24 can be coupled to one another;

FIG. 4 a part of the foldable door 11 of FIG. 2 shortly before reaching the closed position or shortly after being released from the closed position;

FIG. 5 the foldable door 11 of FIG. 4 with the first door element 111 in a sectional view and the second door element 112 in parallel orientation thereto, in which the foldable door 11 can be inserted into the associated door compartment 10;

FIG. 6*a* the lever body 221 of FIG. 3 with a view to a lever chamber 2210 into which the mounting body 211 can be inserted;

FIG. 6*b* the lever body 221 of FIG. 3 with a view to a magnet chamber 2218 into which the holding magnet 282 of FIG. 3 is inserted;

FIG. 6*c* the mounting body 211 of FIG. 3 with a view to a receiving chamber 2110, into which the locking unit 24 of FIG. 3 can be inserted;

FIG. 6*d* the mounting body 211 of FIG. 3 looking at a side which is connectable to one of the door elements 111, 112 of FIG. 1;

FIG. 7*a* the front side of the holding device 2 of FIG. 3 with the holding magnet 282 released from the locking element 20 before reaching the closed position or after leaving the closed position;

FIG. 7*b* the front side of the holding device 2 of FIG. 7*a* in the closed position of the door 11 or foldable door 11 of FIG. 1 with the holding magnet 282 magnetically coupled to the locking element 20;

FIG. 7*c* the front side of the holding device 2 of FIG. 7*b* during the overpressing process by which the holding device 2 is brought into the holding position or released from the holding position;

FIG. 8 the holding device 2 in the position of FIG. 7*a* with a longitudinal section through the mounting body 211 and the lever body 221;

FIG. 9*a* the holding device 2 in a further preferred embodiment with the holding magnet 282 released from the locking element 20 before reaching the closed position or after leaving the closed position;

FIG. 9*b* the holding device 2 of FIG. 9*a* with a longitudinal section through the mounting body 211 and the lever body 212 looking at the locking unit 24 and the preferably designed coupling unit 25;

FIG. 10*a* the holding device 2 of FIG. 9*a* in the closed position of the door 11 or foldable door 11 of FIG. 1 with the holding magnet 282 magnetically coupled to the locking element 20;

FIG. 10*b* the holding device 2 of FIG. 10*a* with a longitudinal section through the mounting body 211 and the lever body 212;

FIG. 11*a* the holding device 2 of FIG. 9*a* during the overpressing process, by which the holding device 2 is brought into the holding position or released from the holding position;

FIG. 11*b* the holding device 2 of FIG. 11*a* with a longitudinal section through the mounting body 211 and the lever body 212;

FIG. 12 the holding device 2 of FIG. 9*a* in exploded view;

FIG. 13*a* the holding device 2 of FIG. 9*a* in exploded view from the front side;

FIG. 13*b* the holding device 2 of FIG. 9*a* in exploded view from the rear side;

FIG. 13*c* the holding device 2 of FIG. 9*a* with a longitudinal section through the mounting body 211 and the lever body 212;

FIG. 14*a* the locking unit 24 of FIG. 3 or FIG. 9*b* and the coupling unit 25 in preferred embodiments; and FIG. 14*b* the coupling unit 25 in the embodiment of a knee joint.

FIG. 1 shows an inventive functional entity 1 in the embodiment of a piece of furniture 1 with a foldable door 11, which is equipped with an inventive holding device 2 and can be inserted into a first door compartment 10, and with a one-piece door 11, which is equipped with an inventive holding device 2 and can be inserted into a second door compartment 10. The piece of furniture 1 preferably comprises side walls 1A, an upper board 1B, a lower board 1C, an intermediate shelf 1E and partition walls 1D on both sides, which together with the side walls 1A delimit the door compartments 10.

The foldable door 11 comprises a first door element 111, which is connected on one side by mounting hinges 13 to a mounting profile 12, and on the other side by foldable-door hinges 3 to a second door element 112, the dimensions of which preferably correspond to the dimensions of the first door element 111. The foldable door 11 is slightly unfolded and can either be fully folded and retracted into the door compartment 10 with the door elements 111, 112 aligned parallel to each other or fully unfolded and transferred into a closed position in which the two door elements 111, 112 are at least approximately aligned in one plane. In order to keep the foldable door 11 in the closed position and to be able to easily release it from the closed position, one of the two door elements 111, 112 is provided with an inventive holding device 2, which in the closed position lies opposite a locking element 20. In the embodiments of the piece of furniture 1 described below, the first door element 111 of the foldable door 11 is provided with the holding device 2. An arrow symbolises that the holding device 2 of the foldable door 11 is guided against the locking element 20 when the door element 111 is turned and is magnetically held by the locking element 20 in the closed position of the foldable door 11. The second door element 112 is not connected to the holding device 2 or any part of it, so that there is no need for assembly work or work to align parts of the device with one another. The alignment of the holding device 2 with respect to the locking element 20, on the other hand, can be carried out without any problems. The locking element 20, for example a magnetic or ferromagnetic plate, such as an iron plate or a steel plate, can be easily connected to the piece of furniture 1, for example screwed or glued. The locking element 20 can also be part of a structural element of the piece of furniture 1.

FIG. 1 shows that the holding device 2 is preferably arranged on the upper side of the door element 111. However, the holding device 2 can also be placed at another position of the door element 111. For example, the locking element 20 can also be mounted on the intermediate floor 1E and the holding device 2 on the door element 111 at the appropriate height.

The use of the holding device 2 in connection with the foldable door 11 is particularly advantageous because the holding device 2 is enclosed between the door elements 111, 112 and does not appear disturbing. The holding device 2 can also be used advantageously on the one-piece door 11, whereby it is advantageous that the holding device can be realised with small dimensions. The inventive holding device 2 can be used with any functional entities, possibly pieces of furniture, which comprise single-part or multi-part doors, which in preferred embodiments can be parked in a door compartment.

In the embodiment shown in FIG. 1, the doors 11 are each connected by mounting hinges 13 to a mounting profile 12 which is held in vertical alignment by a displacement device 9 and is displaceable within the associated door compartment 10. The doors 11 are aligned parallel to the side wall 1A in front of the associated door compartment 10 and can subsequently be displaced into the door compartment 10. For the displacement within the door compartment 10, the mounting profile 12 may also be provided with drive means. Preferably, the mounting profile 12 is connected at the upper side to a support carriage 5A, which is displaceable along an associated support rail 15A into the door compartment 10. On the lower side, the mounting profile 12 can also be connected to a carriage that is guided in a support rail.

In this preferred embodiment, the second separating element 112 of the foldable door 11, the leading edge of which is connected to a guide carriage 5B, is also guided by means of a guide rail 15B which extends along the front side of the piece of furniture 1 and along a curve into the door compartment 10. The foldable door 11 is therefore held at the front side by means of the guide carriage 5B, which in the unfolded state of the foldable door 11 is displaceable along the front side of the piece of furniture 1 and which in the folded state of the foldable door 11 is displaceable into the door compartment 10. The guide carriage 5B always runs ahead of the second separating element 112 in the direction of movement.

FIG. 2 shows the rear side of the foldable door 11 of the piece of furniture 1 of FIG. 1 with the first door element 111, which is connected at the trailing edge by mounting hinges 13 to the mounting profile 12 and at the leading edge by foldable-door hinges 3 to the second door element 112, at the front side of which the guide carriage 5B is mounted. The guide carriage 5B comprises support rollers 51 which can roll on a support element 151 of the guide rail 15B, and guide rollers 52 which are guided in a guide channel 152 of the guide rail 15B. It is shown that the guide rail 15B extends along the front side of the piece of furniture 1 and around a curve into the door compartment 10 of the piece of furniture 1. In order for the guide carriage 5B to follow this curve, it is connected to the second door element 112 by parts 53, 54 of a drive body which are pivotally connected to one another.

The mounting profile 12 is connected at the upper end to a support carriage 5A, which can be moved along a support rail 15A into the door compartment 10. In FIG. 2, the support carriage 5A is guided to a stop device 7 on the front side of the door compartment 10. In this position, which is also shown in FIG. 1, the foldable door 11 is fully extended from the door compartment 10 and can be unfolded to close the furniture opening 100 (see FIG. 1). In FIG. 2, the foldable door 11 has almost reached the closed position and can be brought into the closed position by manual pressure on the foldable door 11, preferably on the leading edge 111, in which the holding device 2 mounted on the rear side of the separating element 111 can magnetically interact with the locking element 20 connected to the front side of the guide rail 15B.

The holding device 2 comprises a mounting part 21, which is preferably connected to the first door element 111 by means of screws and to a holding lever 22 by means of a central shaft 23. At the front end piece 2219 the holding lever 22 is provided with a holding magnet 282 and optionally with two spacer rollers 229.

The optionally provided spacer rollers 229 can roll on the locking element 20 and/or the guide rail 15B during the closing process without the lever body 221 (see FIG. 6*b*) of the holding lever 22 touching the locking element 20 or the guide rail 15B. The holding lever 22 is rotated and the holding magnet 282 is aligned almost frontally against the locking element 20 so that it can magnetically couple to the magnetic or ferromagnetic locking element 20.

It is described below that the holding device 2 comprises a force transmitter 241 (see for example FIG. 3 and FIG. 9*b*), which is cyclically displaceable in a locking unit 24 by the action of pressure between a locking position p1, in which the holding device 2 reaches a holding position, and a release position p2, in which the holding device 2 reaches a release position. The holding device 2 can therefore be coupled and locked with the locking element 20 in the closed position by applying a first manual pressure to the door element 111 and thus to the holding device 2, and unlocked and released from the locking element 20 again by applying a second manual pressure to the door element 111 and thus to the holding device 2.

After being released from the closed position, the two door elements 111, 112 are preferably folded automatically. This folding process is preferably supported by foldable-door hinges 3, which connect the two door elements 111, 112 to each other and which are equipped with a hinge spring 34, which comprises two spring assemblies 341, 342, which are connected to each other by a spring centrepiece. The hinge spring 34 acts on the two hinge levers 31, 32, which on the one hand are connected to each other by a hinge axle 33 and on the other hand are each connected to a hinge cup 39.

FIG. 2 also shows a spacer plate 200 which has no function in the closed position of the foldable door 11. In the folded position of the foldable door 11 with parallel alignment of the door elements 111, 112, the front piece 2219 with the spacer rollers 229, on the other hand, abuts against the spacer plate 200 and is pressed against the mounting part 21 and preferably aligned parallel thereto so that it takes up as little space as possible when pushed into the door compartment 10. Space is thus kept free for the displacement device 9, by means of which the mounting profile 12 is held displaceably in vertical alignment (see FIG. 5).

FIG. 3 shows an exploded view of the inventive holding device 2 of FIG. 2 in a preferred embodiment. The holding device 2 comprises a mounting part 21 with a mounting body 211, a holding lever 22 with a lever body 221, a central shaft 23 for connecting the mounting body 211 and of the lever body 221, an arrangement with a holding magnet 282, a locking unit 24 as well as a coupling unit 25, by means of which the mounting body 211, the lever body 221 and the locking unit 24 can be coupled to each other.

The central shaft 23, which is designed as a one-part or multi-part, forms a lever joint which forms the first articulated connection between the mounting part 21 and the holding lever 22. The central shaft 23 or corresponding parts of the central shaft 23 can also be formed on the mounting body 211 or on the lever body 212.

In a preferred embodiment, the mounting body 211 and the lever body 221 each comprise a coupling member 2111, 2211 with a bearing bore through which the bearing shaft 23 can pass. In the drawing, the bearing shaft 23 is inserted into the mounting body 211. The holding lever 22 can therefore be rotated around the mounted bearing shaft 23 in relation to the mounting part 21.

The coupling unit 25 comprises a coupling body 253 which holds a mounting shaft 251 at one end and a lever shaft 252 at the other end. The mounting shaft 251 and the lever shaft 252 are aligned parallel to each other. The coupling unit 25 is shown twice. Once the coupling unit 25 or the mounting shaft 251 is shown in connection with the mounting body 211 and once in connection with the locking unit 24. However, only one coupling unit 25 is used.

The mounting body 211 comprises a connection plate 2119 with a through hole at both ends through which mounting screws can be passed in order to connect the mounting body 211 to the door element 111. If the mounting body 211 is to be connected to differently designed door elements, for example glass panels, other connection means are provided. For example, the mounting body 211 can also be connected to the door element 111 by means of an adhesive or form-fittingly.

The mounting body 211 is partially U-shaped and comprises two side members 2116 connected to each other by a central body member 2117, which delimit a receiving chamber 2110 in which the locking unit 24 can be held in a force-fitting and/or form-fitting manner. Each of the side members 2116 comprises a mounting shaft bearing in the embodiment of a guide track 2112. The mounting shaft 251 of the coupling unit 25 passes through the parallel guide tracks 2112. The mounting shaft 251 is displaceably mounted in the track-shaped mounting shaft bearing 2112.

The locking unit 24 includes a force transmitter 241 movably mounted within a housing 242 of the locking unit 24 and supported by a reset spring 248 that opposes the application of pressure and pushes the force transmitter 241 back. The force transmitter 241 is also connected to a locking mechanism 249 which cyclically switches between a locking position and a release position when sequential pressure is applied to the force transmitter 241. The locking mechanism 249 is explained in more detail below with reference to FIG. 14*a* as an example. Devices with a locking mechanism are available on the market. Thus, any device with a locking mechanism can be integrated into the holding device 2. An adjustment member 245 is provided on the back of the housing 242, by means of which the locking mechanism 249 can be positioned in order to precisely adjust the locking position. To operate the adjustment member 245, an adjustment channel 2114 is provided in the mounting body 211 through which a tool, for example a screwdriver, can be inserted (see FIG. 8).

The force transmitter 241 is, for example, a cylindrical piston that is slidably mounted in the hollow cylindrical housing 242. A housing collar 243 is provided on the front of the housing 242, which can be inserted into a holding groove 2113 provided in the receiving chamber 2110 of the mounting body 211. The holding groove 2113 holds the locking unit 24 axially immovable within the receiving chamber 2110.

At the front, the force transmitter 241 comprises a fork-shaped connection part 246, which comprises connection tracks 2460 through which the mounting shaft 251 of the coupling unit 25 passes. Thus, the mounting shaft 241 of the coupling unit 24 passes through the connecting tracks 2460 of the connection part 246 and the track-shaped mounting shaft bearing or guide tracks 2112 of the mounting body 211. The lever shaft 252 of the coupling unit 25, on the other hand, is held rotatably but immovably in bearing openings or in a lever shaft bearing 2212 of the lever body 221.

In FIG. 3 the mounting shaft 251 is held at the front end of the guide tracks 2112. The force transmitter 241 is therefore shifted forward as far as possible. If the holding lever 22 is now rotated around the bearing shaft 23 against the mounting part 21, the lever shaft 252 with the coupling body 253 is moved downwards. Hence, the mounting shaft 251 is moved along the guide tracks 2112 and the force transmitter 241 is pushed into the housing 242 of the locking unit 24.

The guide tracks 2112 are curved. Hence, the mounting shaft 251 is not moved parallel to the longitudinal axis of the mounting body 211, but also performs a movement perpendicular to it. To allow this movement of the mounting shaft 251 perpendicular to the longitudinal axis of the mounting body 211, the connection tracks 2460 are provided in the connection part 246, which is connected to the force transmitter 241.

The inclination of the guide tracks 2112 from the position in which the mounting shaft 251 is held in FIG. 3 allows the force required to actuate the locking unit to be adjusted. The steeper the curve, the easier it is to move the mounting shaft 251 downwards, and at the same time the axial movement of the force transmitter 241 is reduced accordingly. Due to the curvature of the guide tracks 2112 on the other side, the guide tracks 2112 can be extended without the need to extend them by the corresponding length in the axial direction and a corresponding extension of the mounting body 211.

The lever body 221 comprises a collar opening 2213 on the upper side, into which the housing collar 243 of the housing 242 can enter. Furthermore, a tool channel 2214 is provided through which a tool, for example a screwdriver, can be guided to the connection plate 2119 of the mounting body 211.

The lever body 221 further comprises a magnet chamber 2218 for receiving the holding magnet 282, a magnet cup 283 and a damping disk 284. It is shown that the holding magnet 282 is inserted into the magnet cup 283, is supported with the magnet cup 283 on the damping disk 284 and is penetrated by a connection screw 281, which on the other side of the lever body 221 is guided through a support spring 285 and is screwed into a threaded pin 2861 of a threaded element 286. The threaded pin 2861 comprises a retaining element 2863 which retains the support spring 285. The threaded pin 2861 is connected to a holding plate 2862, which is inserted together with the support spring 285 into a holding chamber 2215 in the lever body 221 (see FIGS. 6*a* and 6*b*).

Hence, the holding plate 2862 is supported by the support spring 285 and can tilt sideways with the holding magnet 282. The threaded pin 2861 preferably protrudes with sufficient clearance into a through-opening 22180 which connects the magnet chamber 2218 to the holding chamber 2215. The holding magnet 282 can therefore self-align with respect to the contact plate 20 and magnetically couple optimally thereto, as further described below with reference to FIG. 7*b*. The damping disk 284, which is made of silicone, for example, prevents noise during operations to couple or uncouple the holding magnet 282 to or from the locking element 20.

The fork-shaped front piece 2219 of the holding lever 22 is penetrated by a bearing shaft 2291, which holds two spacer rollers 229. The spacer rollers 229 prevent the lever body 221 from hitting the locking element 20, a cabinet part or the adjacent separating element 112.

FIG. 4 shows a part of the foldable door 11 of FIG. 2 shortly before it reaches the closed position or shortly after it is released from the closed position. It can be seen that the door elements 111, 112 of the foldable door 11 are not yet aligned in a plane and the magnet 282 is not yet in contact with the locking element 20. The holding lever 22 is inclined with respect to the mounting part 21 and facing the locking element 20 and will first contact it with the spacer rollers 229 provided on the front piece 2219. The spacer rollers 229, which are preferably made of plastic, will hardly cause any noise.

The holding magnet 282 is recessed into the magnet chamber 2218 and is partially enclosed and projected at the front side by the magnet cup 283, for example by 0.2 mm-2 mm, so that the holding magnet 282 cannot strike the locking element 20.

The locking unit 24 with the force transmitter 241 is shown schematically. The force transmitter 241 supported by the reset spring 248 is axially displaceable and actuates the locking mechanism 249 (see FIG. 14*a*) by displacement between a first displacement position a1, a second displacement position a2 and a third displacement position a3. The function of the locking mechanism 249 is explained below with reference to FIG. 14*a*.

The hinge spring 34 is tensioned in this position of the foldable door 11 and of the folding door hinge 3 and acts to fold the door elements 111, 112 against each other against the acting force of the user. The holding device 2 must therefore be magnetically coupled to the locking element 20 in the closed position and locked by means of the locking unit 24 so that the foldable door 11 is held in the closed position. The hinge spring 34 is therefore loaded by manual force and subsequently serves to fold the foldable door 11 automatically as soon as it is released from the closed position.

FIG. 5 shows the foldable door 11 of FIG. 4 with the first door element 111 in sectional view separated from the foldable-door hinge 3 and the second door element 112 in parallel alignment, in which the foldable door 11 can be inserted into the associated door compartment 10. The front piece 2219 of the holding lever 22 abuts the spacer plate 200 with the spacer rollers 229 and holds the holding lever 22 at least approximately in parallel alignment with the mounting part 21. The holding device 2 therefore also takes up little space inside the door compartment 10.

The hinge levers 31, 32 of the folding door hinges 3, which are connected to each other by the hinge axle 33, have been turned against each other. Hence, the hinge spring 34 is without or largely without tension.

FIG. 6*a* and FIG. 6*b* show the lever body 221 of the holding lever 22 and FIG. 6*c* and FIG. 6*d* show the mounting body 211 of the mounting part 21, which have already been partially described with reference to FIG. 3. The lever body 221 and the mounting body 211 are further described below.

FIG. 6*a* shows the lower side of the lever body 211 that faces the mounting part 21, which is partly U-shaped and comprises two side walls 2216 interconnected by a central body piece 2217, which delimit a lever chamber 2210 into which the mounting part 21 can be fully or partly inserted. Also shown are the two bearing blocks of the lever shaft bearing 2212, the tool channel 2214 and the holding chamber 2215, which preferably fully accommodates the support spring 285 and the threaded element 286 of FIG. 3.

FIG. 6*b* shows the lever body 221 of FIG. 3 looking at the magnet chamber 2218 in which the holding magnet 282 of FIG. 3 is inserted. The holding magnet 282 and the magnet cup 283 are shown in sectional view, which shows that the threaded pin 2861 of the threaded element 286 of FIG. 3, into which the connection screw 281 is screwed, passes through the through-opening 22180 with clearance and is flush with the magnet chamber 2218. The threaded element 286 is supported by the support spring 285 (see FIG. 8), which allows the holding magnet 282 to be lifted and swivelled out of the magnet chamber 2218 by force. As soon as the holding magnet 282 is released from the locking element 20, it is pulled back by the support spring 285 against a damping element or damping disk 284, which dampens impact noises.

FIG. 6*c* shows the mounting body 211 of FIG. 3, which is at least partially U-shaped and comprises two side members 2116 connected to each other by a central body member 2117, which delimit a receiving chamber 2110, in which the locking unit 24 is form-fittingly held by means of the holding groove 2113. A guide track 2112 is provided in each of the side members 2116, which lie opposite each other.

FIG. 6*d* shows the mounting body 211 of FIG. 3 looking at the side that is connected or screwed to one of the door elements 111, 112 of FIG. 1.

FIG. 7*a* shows the front side of the holding device 2 of FIG. 3 with the holding magnet 282 released from the locking element 20 before reaching the closed position or after leaving the closed position. The holding lever 22 is turned outwards as far as possible and contacts the locking element or the contact plate 20 with the spacer rollers 229, which are held on the front piece 2219 of the lever body 221. If the mounting part 21 is guided further against the locking element 20, the holding magnet 282 can couple magnetically to the locking element 20, but without touching it and thus without a perceptible impact noise. The front piece of the mounting body 211 is cut open to show that the mounting shaft 251 penetrates the connection track 2460 of the connection piece 246 and the guide track 2112 of the mounting body 211 on both sides. In this position of the holding device 2, the mounting shaft 251 is held at a first end 21121 (see FIG. 7*b*) of the guide track 2112. The force transmitter 241 is located in FIG. 7*a* at the third displacement position a3 of FIG. 4.

FIG. 7*b* shows the front side of the holding device 2 of FIG. 7*a* in the closed position of the door 11 or foldable door 11 of FIG. 1. In this position the locking unit 24 is locked and the mounting shaft 251 is held close to a second end 21122 of the guide track 2112. The holding lever 22 is still slightly turned relative to the mounting part 21, so the holding magnet 282, which is magnetically coupled to the locking element 20, has been swung out by compressing the support spring 285 (see FIG. 3). It should be noted that the holding device 2 does not reach the position shown in FIG. 7*b* directly from the position of FIG. 7*a*, but only via the position of FIG. 7*c*. Similarly, the position of FIG. 7*a* is not reached directly from the position of FIG. 7*b*, but only via the position of FIG. 7*c*. The force transmitter 241 is located in FIG. 7*b* at the first displacement position a1 of FIG. 4.

FIG. 7*c* shows the front side of the holding device 2 of FIG. 7*b* during the overpressing process, by which the holding device 2 is brought into the holding position or released from the holding position. In this position the mounting shaft 251 is guided to the end 21122 of the guide track 2112 and the force transmitter 241 is moved to the second displacement position a2 of FIG. 4. From this position, the holding device 2 can be moved back to the holding position of FIG. 7*b* or to the release position of FIG. 7*a*. During the transition to the release position, the holding lever 22 is not lifted frontally but laterally. Hence, the holding magnet 282 can be released from the locking element 20 with reduced force.

FIG. 8 shows the holding device 2 in the position of FIG. 7*a* with a longitudinal section through the mounting body 211 and the lever body 221, which are pivotally connected to one another at the rear by the lever joint 23 or the central shaft 23 and at the front by the coupling unit 25. The mounting body 211 comprises an adjustment channel 2114 through which a screwdriver can be inserted axially to turn the adjustment member 245 of the locking unit 24. The lever body 221 comprises a tool channel 2214 through which a screwdriver is inserted, by means of which a mounting screw 21191, which is guided through a stop part 2119 of the mounting body 211, can be screwed tightly in the associated door element.

Also shown are the holding magnet 282 and the threaded element 286, which are connected to each other by a connection screw 281. The threaded element 286, which is located inside the holding chamber 2215, is pushed upwards by a spiral support spring 285, which pulls the holding magnet 282 and the magnet cup 283 against the damping element 284. As the holding magnet 282 comes into magnetic contact with the locking element 20, the threaded element 286 is pulled further into the holding chamber 2215 and the holding magnet 282 is pulled slightly out of the magnet chamber 2218 and rotated against the locking element 20. The holding magnet 282 can therefore fully couple to the locking element 20 within the holding position of the holding device 2 without the holding lever 22 being aligned parallel to the locking element 20 (see FIG. 7*b*).

A rotation of the holding lever 22 around the lever joint 23 relative to the mounting body 21 thus causes a rotation of the coupling body 253, via which a force is transmitted to the force transmitter 241 by means of the mounting shaft 251. During this process, the mounting shaft 251 moves along the guide track 2112. In the preferred embodiment of the holding device 2 described below, this force is transmitted from the coupling body 253 to the force transmitter 241 by means of a coupling shaft 250.

FIG. 9*a* shows the holding device 2 in another preferred embodiment with the holding magnet 282 released from the locking element 20 before reaching the closed position or after leaving the closed position.

The holding device 2 of FIG. 9*a* differs from the holding device 2 of FIG. 8 mainly in the way the force is transmitted from the coupling unit 25 to the locking unit 24.

Furthermore, the lever joint 23, which is arranged displaced towards the front side of the mounting body 211 and by means of which the mounting body 211 and lever body 212 are articulated to each other, is shown in a preferred embodiment.

The holding lever 22 is preferably equipped with two holding magnets 282, which are preferably mounted elastically or supported by a spring, for example as described with reference to FIG. 8. The holding lever 22 may also comprise only one holding magnet 282.

FIG. 9*b* shows the holding device 2 of FIG. 9*a* with a longitudinal section through the mounting body 211 and the lever body 212 looking at the locking unit 24 and the preferably designed coupling unit 25. In this embodiment, the coupling body 253 of the coupling unit 25 additionally holds a coupling shaft which engages in the connection track(s) 2460 of the connection part 246 of the force transmitter 241. The force transmitter 241 is extended and the plate-shaped coupling body 253 was rotated clockwise by the holding lever 22, thereby guiding the coupling shaft 250 forward.

FIG. 10*a* shows the holding device 2 of FIG. 9*a* in the closed position of the door 11 or foldable door 11 of FIG. 1 with the holding magnet 282 magnetically coupled to the locking element 20.

FIG. 10*b* shows the holding device 2 of FIG. 10*a* with a longitudinal section through the mounting body 211 and the lever body 212. By rotating the holding lever 22, the coupling body 253 has been rotated counterclockwise and the force transmitter 241 has been pushed almost completely into the locking unit 24.

FIG. 11*a* shows the holding device 2 of FIG. 9*a* during the overpressing process, by which the holding device 2 is brought into the holding position or released from the holding position.

FIG. 11*b* shows the holding device 2 of FIG. 11*a* with a longitudinal section through the mounting body 211 and the lever body 212. The holding lever 22 has been pushed further down and the coupling body 253 has been rotated further counterclockwise. As a result, the force transmitter 241 was fully inserted into the locking unit 24 and the locking mechanism 249 was pressed over and released from the holding position or engaged in the holding position.

FIG. 12 shows an exploded view of the holding device 2 of FIG. 9*a*. The coupling member 2211 of the holding lever 22 is fork-shaped and comprises two inwardly directed lever shafts 23 or lever shaft segments 23 which can be inserted through mounting tracks 21111 into bearing openings 21110. The lever shaft segments 23 comprise flattenings which allow the insertion through the L-shaped mounting track 21111 into the bearing openings 21110, in which the lever shaft segments 23 are subsequently rotated and held rotatably.

FIG. 13*a* shows the holding device 2 of FIG. 9*a* in an exploded view from the front. Symbolically, a dotted line L12 shows that the lever shaft segments 23 of the holding lever 22 correspond to the bearing openings 21110 of the mounting body 21. Line L51 shows that the mounting shaft 251 is held in the mounting body 21. Line L25 shows that the lever shaft 252 is held in the lever body 221. Line L45 shows that the coupling shaft 250 is held in the connection part 246 of the locking unit 24.

FIG. 13*b* shows an exploded view of the holding device 2 of FIG. 9*a* from the rear. Optionally, a second reset spring 248' is provided, which in all embodiments of the holding device 2 can act on the mounting part 21 on the one hand and on the holding lever 22 on the other hand in order to rotate them apart as soon as the locking device 24 is released. For example, spring coils of the reset spring 248' surround the central shaft 23, while end pieces of the reset spring 248' rest against the mounting body 211 and the lever body 221.

FIG. 13*c* shows the holding device 2 of FIG. 9*a* from the side with a longitudinal section through the mounting body 211 and the lever body 212. The corresponding elements of the articulation system are indicated by arrows. The mounting shaft bearing 2112 consists of two opposing bearing sleeves in which the mounting shaft 251 is held. The lever shaft bearing 2212, on the other hand, in which the lever shaft 252 is held, is designed in the shape of a track. The coupling shaft 250, on the other hand, is held displaceably in the connecting track 2460 of the connecting part 246. The embodiment of the lever shaft bearing 2212 and the connecting track 2460 allow the lever shaft 252 and the coupling shaft 250 to perform lateral movements during the rotation of the coupling body 253. Guide tracks can therefore be used as required to allow free rotation of the coupling unit 25.

Furthermore, the reset spring 248 is shown, which acts on the force transmitter 241. Thus, the reset spring 248' of FIG. 13*b* and/or the reset spring of FIG. 13*c* can be provided. The reset spring 248 or the reset springs 248, 248' can also be present in other embodiments.

FIG. 14*a* shows in a principal view the locking unit 24 of FIG. 3 or FIG. 9*a* with the force transmitter 241, which is held in a cylindrical housing 242, supported on a reset spring 248 and connected via a lever joint 2410 to a circulating lever 2411. The circulating lever 2411 has a front piece projecting into a circulating mechanism 249, which includes a circulation channel 2490 enclosing a core element 2491. During axial displacements of the force transmitter 241 between the first displacement position a1, the second displacement position a2 and the third displacement position a3 (see FIG. 4), the front piece of the circulating lever 2411 is cyclically guided clockwise around the core element 2491 within the circulation channel 2490. From a release position p2, in which the holding device 2 assumes the position of FIG. 7*a* or FIG. 9*a*, the circulating lever 2411 is transferred by pressing over the holding device 2 into a first transitional position p31, in which the holding device 2 assumes the position of FIG. 7*c* or FIG. 11*a*. When pressure is removed from the holding device 2, the circulating lever 2411 is moved into a locking position p1, in which the circulating lever 2411 is held by the core element 2491 and the holding device 2 assumes the position of FIG. 7*b* or FIG. 10*a*. As soon as a further pressure is applied to the holding device, the circulating lever 2411 is moved from the locking position p1 to a second transitional position p32, in which the holding device 2 assumes the position of FIG. 7*c* or FIG. 11*a*, and from there back to the release position p2. The force transmitter 241 can therefore be moved into the locking position p1 by a first overpressing and back into the release position p2 by a second overpressing.

FIG. 14*a* also shows the coupling unit 25, which is connected to the connection part 246 of the force transmitter 241 by the mounting shaft 251, as also shown in FIG. 8. The mounting shaft 251 thus fulfils a dual function in that it is articulated to the connection part 246 on the one hand and to the mounting body 211 on the other. A preferably provided coupling shaft 250, which can preferably be coupled to the connection part 246 instead of the mounting shaft 251, is shown in dashed lines.

FIG. 14*b* shows the coupling unit 25 in the embodiment of a knee joint with a coupling body 253, which comprises two coupling levers 2531, 2532, which are connected to each other by the coupling shaft 250, which is provided to act on the force transmitter 241. The lever shaft 252 is in turn articulated to the lever body 221 and the mounting shaft 251 is articulated to the mounting body 211. When the lever shaft 252 and the mounting shaft 251 are actuated, the coupling shaft 250 is deflected and the force transmitter 241 is actuated.

LIST OF REFERENCES

1 functional entity, piece of furniture, e.g. wardrobe
1A side walls
1B upper board
1C lower board
1D separation wall
10 first or second door compartment or parking space
100 interior of the functional entity 1
111 first door element
112 second door element
11 door or foldable door
12 mounting profile
13 mounting hinges
15A support rail for the support carriage 5A
15B guide rail for the guide carriage 5B
151 support element
152 guide channel
2 holding device
20 magnetic or ferro-magnetic locking element
200 spacer plate
21 mounting part
211 mounting body
2110 receiving chamber
2111 coupling member
21110 bearing opening
21111 mounting track
2112 mounting shaft bearing, guide track
21121 first end of the guide track 2112
21122 second end of the guide track 2112
2113 holding groove
2114 adjustment channel
2115 chamber extension
2116 side members
2117 central body member
2119 connection plate
21191 mounting screw
22 holding lever
221 lever body
2210 lever chamber
2211 coupling member
2212 lever shaft bearing, guide track
2213 collar opening
2214 tool channel
2215 holding chamber
2216 side walls
2217 central body piece
2218 magnet chamber
22180 through-opening
2219 front piece
22190 bearing opening
229 spacer rollers
2291 bearing shaft
23 lever joint, central shaft
24 locking unit
241 force transmitter
2410 lever joint
2411 circulating lever
242 housing
243 housing collar
245 adjustment member
2450 engagement element
246 connection part
2460 connection track
2461 connection plates
248 reset spring
249 locking mechanism
2490 circulation channel
2491 core element
25 coupling unit
250 coupling shaft

251 mounting shaft
252 lever shaft
253 coupling body, one-part or multi-part
2531 first lever part
2532 second lever part
281 connection screw
282 holding magnet
283 magnet cup
284 damping disk
285 support spring
286 threaded element
2861 threaded pin
2862 holding plate
2863 retaining element
3 foldable-door hinge
31 first hinge lever
32 second hinge lever
33 hinge axle
34 hinge spring
341 first spring pack
342 second spring pack
343 spring centrepiece
39 mounting part, hinge cup
5A support carriage
5B guide carriage
51 support rollers
52 guide rollers
53 first carriage body part
54 second carriage body part
9 displacement device
a1 first displacement position
a2 second displacement position
a3 third displacement position
p1 locking position
p2 release position
p31 first transitional position
p32 second transitional position
x rotation axis
y lever axis

The invention claimed is:

1. A holding device for holding a pivotally mounted door element in a closed position and for releasing the door element from the closed position, the holding device comprising:

a locking unit comprising (i) a force transmitter, which has a connection part, and (ii) a locking mechanism, which by application of pressure is configured to be cyclically transferable between a locking position, in which the locking mechanism reaches a holding position and the holding device is connectable or connected to a locking element that consists at least partially of magnetic or ferromagnetic material, and a release position, in which the locking mechanism reaches a release position and the holding device is disconnectable or disconnected from the locking element;

a mounting part comprising a mounting body and a holding lever with a lever body, the mounting body being connectable to the door element and being connected by a lever joint to the lever body, and the lever body comprising a first piece, which holds at least one holding magnet that, in the holding position, is force-lockingly connected or connectable to the locking element; and a coupling unit comprising a single-part or multi-part coupling body that, at one end distanced from the lever joint, is pivotally connected to the mounting body and, at the other end, is pivotally connected to the lever body and is pivotally connected to the connection part of the locking unit.

2. The holding device according to claim 1, wherein the coupling body is connected with a lever shaft, which is held by the lever body, and with a mounting shaft, which is held by the mounting body, and by means of the lever shaft, by means of the mounting shaft, or by means of a coupling shaft, the coupling body is pivotably connected to the connection part of the locking unit.

3. The holding device according to claim 2, wherein the lever shaft is held in the lever body in a guide track and is pivotally connected to the connection part of the locking unit, or the mounting shaft is held in the mounting body in a guide track and is pivotally connected to the connection part of the locking unit.

4. The holding device according claim 1, wherein, wherein the coupling body comprises a first lever part, a second lever part, and a coupling shaft that (i) cooperates directly or indirectly with the connection part of the force transmitter and (ii) is pivotally connected, at one end, by the first lever part and the mounting shaft to the mounting body and, at the other end, by the second lever part and the lever shaft to the holding body.

5. The holding device according to claim 1, wherein the mounting body comprises a receiving chamber in which the locking unit is held in a force-fitting or form-fitting manner, or the lever body comprises a lever chamber in which the locking unit is held in a force-fitting or form-fitting manner, and the mounting body and the lever body are insertable into one another.

6. The holding device according to claim 1, further comprising a reset spring that acts directly or indirectly on the force transmitter or on the coupling unit and automatically returns the locking unit from the holding position to the release position.

7. The holding device according to claim 2, wherein the connection part comprises at least one connection plate that is provided with a connection track within which the lever shaft, the mounting shaft, or the coupling shaft is slidably held.

8. The holding device according to claim 1, wherein at least one spacer roller is rotatably held at the first piece of the lever body.

9. The holding device according to claim 1, wherein the first piece of the lever body comprises a magnet chamber into which the at least one holding magnet is sunk or into which several holding magnets are sunk.

10. The holding device according to claim 9, wherein a through-opening adjoins the magnet chamber, a connection screw being passed through the through-opening, and the connection screw connecting the at least one holding magnet to a threaded element, that is supported on a support spring and that holds the holding magnet axially displaceably, or swivelably, or axially displaceably and swivelably.

11. The holding device according to claim 1, wherein the at least one holding magnet is at least partially enclosed by a plastic magnet cup and is overlapped such that direct contact between the holding magnet and the locking element is avoided, or the at least one holding magnet is at least partially enclosed by the plastic magnet cup which is supported on a damping element.

12. A functional entity with a door element and the holding device according to claim 1, wherein the holding device is connected to the door element and is configured to cooperate with a locking element connected to a stationary part of the functional entity, or the holding device is connected to the stationary part of the functional entity and is configured to cooperate with a locking element connected to the door element.

13. The functional entity according to claim 12, wherein the holding device is arranged at a lower side or an upper side of the door element, or the holding device is arranged at each of a lower side and an upper side of the functional entity.

14. The functional entity according to claim 12, wherein the door element is connected by at least one foldable-door hinge with an additional door element.

15. The functional entity according to claim 12, wherein the door element is connected by mounting hinges with a mounting profile that is held displaceable within a door compartment of a piece of furniture.

* * * * *